United States Patent [19]
Hattori

[11] Patent Number: 5,761,496
[45] Date of Patent: Jun. 2, 1998

[54] SIMILAR INFORMATION RETRIEVAL SYSTEM AND ITS METHOD

[75] Inventor: Masakazu Hattori, Yokohama, Japan

[73] Assignee: Kabushiki Kaisha Toshiba, Kawasaki, Japan

[21] Appl. No.: 355,971

[22] Filed: Dec. 14, 1994

[30] Foreign Application Priority Data

Dec. 14, 1993 [JP] Japan .................................. 5-313776

[51] Int. Cl.$^6$ ........................................... G06F 17/30
[52] U.S. Cl. ........................................... 395/605; 395/604
[58] Field of Search ................... 364/DIG. 1, DIG. 2; 395/600, 603, 604, 605

[56] References Cited

U.S. PATENT DOCUMENTS

| | | | |
|---|---|---|---|
| 4,670,848 | 6/1987 | Schramm | 395/60 |
| 4,868,733 | 9/1989 | Fujisawa et al. | 395/600 |
| 5,278,980 | 1/1994 | Pedersen et al. | 395/600 |
| 5,321,833 | 6/1994 | Chang et al. | 395/600 |
| 5,428,737 | 6/1995 | Li et al. | 395/161 |
| 5,500,920 | 3/1996 | Kupiec | 395/2.79 |

FOREIGN PATENT DOCUMENTS

| | | |
|---|---|---|
| 3-131973 | 6/1991 | Japan . |
| 5-128158 | 5/1993 | Japan . |

*Primary Examiner*—Thomas G. Black
*Assistant Examiner*—Maria N. Von Buhr
*Attorney, Agent, or Firm*—Oblon, Spivak, McClelland, Maier & Neustadt, P.C.

[57] ABSTRACT

The retrieval request input means 110 reads a retrieval request consisting of input keywords set up by the user as well as their importance degrees. The retrieval management section 120 causes the relation keyword generation section 121 and the retrieval expression generation section 122 to generate a retrieval expression by using background knowledge and retrieval parameters. The retrieval management section 120 causes the database management section to retrieve data from the database 160 based on a generated retrieval expression, causes the relation data acquisition section 124 to present a temporary retrieval result to the user, and causes the relevance database management section 123 to store user-instructed relation data into the relevance database 150. The retrieval management section 120 changes the retrieval parameters based on this relation data, causes the retrieval expression generation section 122 to generate a mew retrieval expression, and causes the database management section 125 to retrieve data again. The retrieval result output section 130 outputs the final retrieval result. Thus, this system allows the user to reflect his retrieval strategy and background knowledge about data easily and precisely and to execute similarity retrieval efficiently on a trial and error basis, without a substantial increase in the retrieval time.

34 Claims, 27 Drawing Sheets

FIG. 4

```
ENTER INPUT KEYWORDS AND IMPORTANCE DEGREES.>

ATTRIBUTE 1, STRAWBERRY, 0.7
ATTRIBUTE 2, TIGURE, 0.8

END
```

FIG. 6

```
SELECT RELATED ITEMS FROM THOSE GIVEN BELOW.>
 TO END, ENTER END.

(1)
ATTRIBUTE 1, APPLE
ATTRIBUTE 2, FIGURE
ATTRIBUTE 3, 3313
ATTRIBUTE 4, YOKOHAMA (2)
ATTRIBUTE 1, PEAR
ATTRIBUTE 2, PRICE
ATTRIBUTE 3, 12
ATTRIBUTE 4, TOKYO (3)
............
............

|  | INPUT INDEX | RELATION INDEX |
|---|---|---|
| ATTRIB.1 | STRAWBERRY | PEAR, APPLE |
| ATTRIB.2 | FIGURE | FIXED PRICE, PRICE |

SELECT * FROM CASE DATA
   WHERE(((ATTRIB.1=STRAWBERRY)OR(ATTRIB.1=PEAR)OR(ATTRIB.1=APPLE))AND
    ((ATTRIB.2=FIGURE)OR(ATTRIB.2=FIXED PRICE)OR(ATTRIB.2=PRICE)))

|  | INPUT INDEX | RELATION INDEX |
|---|---|---|
| ATTRIB.1 | STRAWBERRY | |
| ATTRIB.2 | FIGURE | FIXED PRICE |

```
SELECT * FROM CASE DATA
   WHERE((ATTRIB.1=STRAWBERRY)AND
     ((ATTRIB.2=FIGURE)OR(ATTRIB.2=FIXED PRICE)))
```

FIG. 18

```
THE FOLLOWING DATA HAS BEEN RETRIEVED.
THE NUMBER OF RETRIEVED RECORD IS 25.
```

| ATTRIB.1 | ATTRIB.2 | ATTRIB.3 | ATTRIB.4 |
|---|---|---|---|
| STRAWBERRY | FIGURE | 3213 | TOKYO |
| PEAR | FIGURE | 1234 | TOKYO |
| ............ | ............ | ............ | ............ |

FIG. 24

```
ENTER INPUT KEYWORDS AND IMPORTANCE DEGREES.>

ATTRIBUTE 1, STRAWBERRY, 0.7
ATTRIBUTE 2, TIGURE, 0.8

END

SET UP THE MAXIMUM AND MINIMUM RETRIEVAL COUNTS.
(THE DEFAULTS ARE 40 AND 10)

```
THE FOLLOWING DATA HAS BEEN RETRIEVED.
THE NUMBER OF RETRIEVED RECORD IS 25.
```

| ATTRIB.1 | ATTRIB.2 | ATTRIB.3 | ATTRIB.4 |
|---|---|---|---|
| STRAWBERRY | FIGURE | 3213 | TOKYO |
| PEAR | FIGURE | 1234 | TOKYO |
| ........ | ........ | ........ | ........ |
| ........ | ........ | ........ | ........ |

5,761,496

SIMILAR INFORMATION RETRIEVAL SYSTEM AND ITS METHOD

TECHNICAL FIELD

This invention is concerned with an information rtrieval system which allows a user to retrieve information from databases, such as document bases or case bases, containing various types of data; it is concerned with and intended particularly for a similar information retrieval system and its method which, upon receipt of a retrieval request from a user, allows him to retrieve information satisfying a retrieval condition included in the retrieval request.

BACKGROUND OF THE INVENTION

In a general database system, the designers of the system and the users of the system are separate. In such a system, it is difficult for a user, who did not participate in the design of the system, to completely understand how data is distributed in the database. Therefore, the user must retrieve information on a trial and error basis. That is, the user starts retrieval of information by specifying a retrieval condition and, if he fails to get an intended reslt, specifies another retrieval condition to repeat retrieval.

The efficiency of retrieval on a trial and error basis such as the one described above depends on how the user changes a retrieval condition after he fails in retrieving an intended result. This is because the user may fail in retrieving an intended result again even if he changes the retrieval condition and tries to retrieve information. That is, if the user is satisfied with a retrieval result obtained as a result of retrieval on a trial and error basis, he can add another retrieval condition to make a more efficient retrieval to get a result more suited to his need. In contrast, if the user is not satisfied with a retrieval result, in other words, if the user fails in retrieving an intended result, he must change the retrieval condition and make another retrieval.

For example, a retrieval result obtained by information retrieval on a trial and error basis shows that the condition is "less restrictive" or "too restrictive". A "less restrictive" condition returns more data items than are expected by the user. In this case, the user must specify a more restrictive retrieval condition to reduce the number of data items. A "too restrictive" condition returns less data items than are expected by the user. In this case, the user must specify a less restrictive retrieval condition to increase the number of data items.

Traditionally, two criteria have been used to evaluate retrieval performance: "calling rate" and "precision". These criteria are based on the subjective point of view on the relation of retrieved information which is used when the user retrieves information from databases or document bases containing sentence quotation or abstracts. The calling rate and the precision are defined as follows. That is, the calling rate is the ratio of the number of retrieved data items to the total number of data items stored in the database; the precision is the ratio of the number of related data items to the number of data items included in the set of retrieved data items. There is usually a tradeoff between these two criteria. In information retrieval, it is desirable that these two criteria be as close as the maximum value of 1. In terms of information retrieval conditions described above, the "less restrictive" condition means that the "calling rate" is too low, while the "too restrictive" condition means that the "precision" is too low.

Therefore, for the user to efficiently retrieve information on a trial and error basis, while maintaining a high "calling rate" and a high "precision" it is necessary to change a retrieval condition appropriately using the background knowledge about data contained in the database. That is, because data contained in a database usually has a conceptual relationship structure which enables the user to retrieve information using background knowledge, it is important to utilize this background knowledge to generate appropriate retrieval conditions. Therefore, to change a retrieval condition used in information retrieval on a trial and error basis, the user must specify an appropriate retrieval condition which precisely indicates what information he really wants and what he knows about the information to be retrieved. For example, in an environmental pollution database, the user must change retrieval condition items, such as pollutant types to be investigated, by using background knowledge about the concept of pollutant, biology, and media.

However, for a general user who is not fully familiar with the necessary background knowledge, it is difficult to change a retrieval condition by reflecting the background knowldege on it. This means that it is difficult for the user to retrieve a satisfactory result and to increase retrieval efficiency without extra retrieval requests.

The patent information retrieval system is example of trial-and-error-basis retrieval systems described above. This patent information retrieval system, designed around the indexing retrieval method, uses Boolean expressions containing keywords, such as technical factors, objects, and input/output function, which are logically ANDed or ORed. This system enables the user to narrow down to several scores of retrieval data items which satisfy the condition if the specified keywords are appropriate; however, if the specified keywords are not appropriate, the system retrirves several hundreds or thousands of unrelated data items. To avoid this condition, it is vital to retrieve (1) by specifying appropriate initial keywords based on the distribution of patent information and 2) by changing the condition using background information to reduce the number of data items, retrieved on a trail and error basis, to a controllable number of data items.

For example, if the keyword "similarity AND retrieval AND data" does not give a satisfactory result, related keywords such as "(similarity OR ambiguity) AND retrieval AND (information OR sentence OR data)", must be specified to retrieve information in a broader range. Conversely, if the retrieval condition is too non-restrictive, a more strict condition must be specified by removing one or more keywords; for example, the keyword "(similarity OR ambiguity) AND retrieval AND data" should be used. To efficiently make a retrieval on a trial and error basis, retrieval know-how based on experience must be used to reflect background knowledge for the retrieval condition. This retrieval know-how is called a search strategy. However, it is difficult for an inexperienced user to use a search strategy to change the retrieval condition appropriately.

In addition, when similarity retrieval is used to search all the data in a general database or a document base for desired data, the system load becomes higher and the retrieval processing takes too long. That is, searching the whole database for desired data requires a large number of data transfer between main storage where matching calculation is performed and secondary storage where data is permanently stored. There is a great difference in access time between the slowest main storage and the fastest secondary storage such as a disk. Currently, it is said that the former is 1000 times faster than the latter.

Trial-and-error-basis retrieval described above, which requires as many data retrieval operation as the retrieval of desired data from the whole data, results in long retrieval times. Thus, to make the trial-and-error-basis retrieval system more practical, some mechanism is required to reduce the time it uses to retrieve information on a trial and error basis.

There is also a method which reads only the data on which similarity retrieval is to be made by making a keyword retrieval before data is read from secondary storage. To do so, the user must generate a retrieval condition under which only the specified number of data items are retrieved. It also requires experimental retrieval know-how in order to generate an appropriate retrieval condition on which background knowledge about data is properly reflected. Again, this is difficult for a general user. In addition, trial-and-error retrieval which does not involve secondary storage access requires many times the number of data transfers required with the retrieval of data from the whole database. Therefore, simple trial-and-error retrieval usually results in long retrieval times. To put into use a trial-and-error similarit retrieval system which does not involve secondary storage access, some mechanism is required to prevent the system from spending too long in retrieval.

To respond to a request for a mechanism required to build a practical trial-and-error retrieval system, several systems have been proposed. One of the most promising retrieval systems is a "relevance feedback" which allos the user to interact with the system. This "relevance feedback", designed primaril for use with document bases, investigates sentences obtained via questions, selects related documents based on titles or abstracts, adds index words to search questions, and deletes words not appearing in the related document. However, an informal relevance feedback requires the user to evaluate the validity of each index word, increasing user loads.

As an alternative method which solves the problems with the "relevance feedback", the "automatic relevance feedback", which is implemented in the SMART system (Salton and McGill, (1983) An Introduction to Modern Information Retrieval, New York, MacGraw-Hill) was proposed. In this system, a weight is assigned to each index word contained in a question to represent the degree of relation. This weight is automatically adjusted according to the user's judgement on the relation of documents retrieved based on the question. This idea, composed of information retrieval and question re-organization, seems to be effective, but is not widely accepted. The reasons why it is not accepted are 1) the user must do additional indexing processing, 2) the adjustment of weight during question re-organization requires experience, and 3) there is a probability that the retrieval result is divergent rather than convergent.

Some other trial-and-error similarity retrieval systems or document retrieval systems are introduced, for example, in "Contents Retrieval Function in Electronic Document Reference Support Systems BENLI (ishibashi and others, 45th national convention of the Federation for Information Processing) and in "Building an Intelligent Database System with a Flexible Structure" (Ogata and others, 45th national convention of the Federation for Information Processing). However, these systems have problems such as 1) detailed and procedural strategic knowledge, such as retrieval failure knowledge, is necessary, 2) the retrieval speed is too slow because the user must make an unsystematic retrieval, and 3) it is difficult to reflect user's retrieval strategy.

As described above, in an information retrieval system which retrieves information or data from data storage systems, such as databases, document bases, and case bases, which contains various types of data, retrieval is made on a trial and error basis; that is, a retrieval condition is set, the result is investigated according to the retrieval condition and, based on the result, a new retrieval condition is set. An interactive information retrieval system, designed to reflect user's retrieval strategy as necessary, is one of these systems. However, it has the following problems: 1) Because information is retrieved in an unsystematic manner, the result of interactive retrieval is divergent. 2) it is difficult to generate a retrieval condition, on a trial and error basis, which obtains all the related information, and 3) the background knowledge about data is not reflected properly or highly strategic knowledge is required.

SUMMARY OF THE INVENTION

This invention is provided to solve the problems of the prior art. An object of this invention is to provide an interactive similar information retrieval system and its method which interact with the user to allow him to reflect his retrieval strategy simply and precisely, to automatically generate a retrieval condition that allows the user to reflect his background knowledge in a simple data structure, easily and precisely, and to enable the user to execute similarity retrieval efficiently on a trial and error basis, without a substantial increase in the retrieval time.

Another object of this invention is to provide a retrieval result condition type similar information retrieval system and its method which allow the user to reflect his retrieval strateby easily and precisely so that he is satisfied with retrieval results, to automatically generate a retrieval condition that allows the user to reflect his background knowledge having a simple data structure, easily and precisely, and to enable the user to execute similarity retrieval efficiently on a trial and error basis, without a substantial increase in the retrieval time.

A similar information retrieval system according to a first embodiment of this invention is a similar information retrieval system for executing similar retrieval for a database on a trial and error basis and basically includes a database management means, retrieval request input means, relation keyword generation means, retrieval expression generation means, retrieval management means and retrieval result output means. The database management means retrieves data from a database. The retrieval request input means accepts a retrieval request consisting of input keywords and input keyword importance degrees as a user enters it. The relation keyword generation means is a means for generating relation keywords related to input keywords obtained by the retrieval request input means using background knowledge and retrieval parameters. The retrieval expression generation means is a means for generating a retrieval expression using input keywords obtained by the retrieval request input means and relation keywords obtained by the relation keyword generation means. The retrieval management means is a means for setting retrieval parameters to be used by the relation keyword generation means and, based on a retrieval expression obtained by the retrieval expression generation means, causes the database management means to execute retrieval. The retrieval result output means is a means for outputting final retrieval results obtained by retrieval execution using the database management means.

More specifically, in variations of the first embodiment of a similar information retrieval system further comprises a relation judgment information acquisition means and a relation judgment information management means in addition to the basic components of the first embodiment. The relation judgment information acquisition means is a means for presenting a part of temporary retrieval results, obtained by the execution of the database management means, to a user as retrieval data, and for acquiring a retrieval processing stop instruction or data relation judgment information from a user. The relation judgment information management means is a means for storing and retrieving relation judgment information acquired by the relation judgment information acquisition means. In addition, the retrieval management section of this similar information retrieval system causes the relation judgment information acquisition means to present retrieval data to a user and, if the user is not satisfied with this retrieval data and the retrieval presentation means obtains relation judgment information from the user, modifies the retrieval parameters using this relation judgment information, causes the relation keyword generation means to charge relation keywords, causes the retrieval expression generation means to generate a new retrieval expression and, based on this new retrieval expression, causes the database management means to execute retrieval again. The retrieval management means also sends retrieval data as the final retrieval result to the retrieval result output means if the user is satisfied with this retrieval data and the retrieval presentation means obtains a retrieval processing stop instruction from the user. In other variations of the first embodiments of similar acquisition means and the relation judgment information the relation judgment information acquisition means acquires relation data or non-relation data or its instruction information, or relation data and non-relation data or instruction information. Also, the relation judgment data management means stores and retrieves data or its instruction information acquired by the relation judgment information acquisition means. In other variations of the first embodiments of similar information retrieval systems, the relation keyword generation means performs propagation using input keywords, entered from the retrieval request means, as initial propagation data, and generates relation keywords using the retrieval parameter, set up by the retrieval management section, as a threshold. One embodiment of the relation keyword generation means of the similar information retrieval system uses an associative network as background knowledge. As the relation degree between the first keyword which is an input keyword and the second keyword which links to the first keyword, it finds the maximum value of the products of the relation degrees of the link strings between the first keyword and th second keyword. And, if the product of this relation degree and the importance degree of the input keyword is equal to or greater than the retrieval parameter, it generates a relation keyword using the second keyword. Another embodiment of the relation keyword generation means of the similar information retrieval system uses an associative network as background knowledge. As the relation degree betweem the first keyword which is an input keyword and the second keyword which links to the first keyword, it finds the sum of the prodcuts of the relation degrees of the link strings between the first keyword and the second keyword. And if, the product of this relation degree and the importance degree of the input keyword is equal to or greater than the retrieval parameter, it generates a relation keyword using the second keyword. Another embodiment of the relation keyword generation means of the similar information retrieval system claimed in claim 8 uses a conceptual hierarchy as background knowledge. It finds the product of the relation degree of the link strings from the first keyword to the third lowest-level keyword common to and higher than the first keyword and the second keyword as a relation degree between the first keyword wich is an input keyword and the second keyword which indirectly links to this first keyword. It then generates a relation keyword using the second keyword if the product of this relation degree and the importance degree of the input keyword is equal to or greater than said retrieval parameter. In the second representative embodiment of a similar information retrieval system the retrieval request input means and reads not only input keywords and their importance degrees but also a retrieval result condition. Also the retrieval management means changes retrieval parameters, cause the relation keyword generation means to change relation keywords, causes the retrieval expression generation means to generate a new retrieval expression and, based on this new retrieval expression, causes the database management means to execute retrieval again if the user is not satisfied with a temporary retrieval result obtained through retrieval execution via the database management means. The retrieval management means also sends a retrieval result as the final retrieval result to the retrieval result output means if a temporary retrieval result, obtained through execution of the database management means, satisfies the retrieval result condition obtained by the retrieval request input means.

Other variations of the second embodiment of similar information retrieval system such as the above information retrieval systems further comprise a retrieval count estimation means for estimating a retrieval count corresponding to a retrieval expression obtained by the retrieval expression generation means. Another similar information retrieval system includes retrieval management means which causes the retrieval expression generation means to generate a retrieval expression on a trial and error basis while estimating the retrieval count of a retrieval expression using the retrieval count estimation means without actual database retrieval through the use of the database management means. And, after this processing, retrieval management means causes the retrieval expression generation means to generate a retrieval expression on a trial and error basis while causing the database management means to retrieve data from an actual database.

Other similar information retrieval systems include relation keyword generation means is structured as with the various relation keyword generation means described above.

Similar information retrieval methods correspond to the first and second embodiments of similar information retrieval systems and their variations.

Similar information retrieval system and their methods according to this invention automatically generate a retrieval expression, which is a retrieval condition, and allows a user to do similarity retrieval on a trial and error basis effectively.

First, similar information retrieval systems and similar information retrieval methods generate a retrieval expression using input keywords entered as a retrieval request and relation keywords based on background knowledge and, based on this retrieval expression execute retrieval operations and present a temporary retrieval result to a user. If this temporary retrieval result does not meet the user's retrieval strategy, the system asks the user to enter relation judgment information which indicates the user's retrieval strategy, and the system acquires this information form the user. Using retrieval parameters which reflect the user's retrieval strategy, the system modifies parameters, generates a new retrieval expression and, based on this retrieval expression, executes retrieval again so that the user's retrieval strategy and background knowledge can be reflected. A retrieval expression is generated based on the user's relation judgment information which allows a retrieval expression to be fed back interactively, thus making the retrieval expression to be tailored to user's needs. A retrieval expression generated by using the importance degree of a user-specified input keyword, relation keywords generated based on background knowledge, and relation judgment information acquired from the user makes it possible to for both the user's retrieval strategy and background information to be well reflected. Therefore, this system enables the user to reflect user's retrieval strategy easily and precisely, to reflect background knowledge consisting of simply-structured data easily and precisely, and to perform similarity retrieval on a trial and error basis efficiently witout a significant increase in the retrieval time.

Other similar information retrieval systems and similar information retrieval methods background knowledge such as an associative network or conceptual hisrarchy, perform simple calculation to find such values as a product of link string relation degrees, and automatically generate relation keywords with a retrieval parameter as a threshold. This method allows the user to better reflect background knowledge consisting of simply-structured data.

Additional similar information retrieval systems and similar information retrieval methods generate a retrieval expression from input keywords which are entered as a retrieval request and relation keywords based on background knowledge and, based on this retrieval expression, execute retrieval. And, if a tempoorary retrieval result obtained through execution of retrieval expression does not satisfy a retrieval result condition set up by the user, the system modifies retrieval parameters, generates a new retrieval expression and, based on this retrieval expression, executes retrieval again, allowing the user to retrieve data which reflects the user's retrieval strategy and background knowledge. That is, using user-specified input keywords and their importance degrees, retrieval result conditions, and relation keywords generated based on background knowledge, it is possible to reflect the user's retrieval strategy and background knowledge on a retrieval expression. Therefore, this system enables the user to specify a retrieval result condition to reflect his retrieval strategy easily and precisely, to reflect background knowledge including simply structured data, easily and precisley, and to perform similarity retrieval on a trial and error basis efficiently without a significant increase in the retrieval time.

Other similar information retrieval systems and similar information retrieval methods estimate a retrieval count for each retrieval expression and, therefore, select only retrieval expression that satisfy a user-specified retrieval result condition. This allows a retrieval expression to be generated in the test mode beforehand, thus reducing wasteful actual retrieval operations which would be caused by inappropriate expression.

Additional similar information retrieval systems and similar information retrieval methods use background knowledge such as an associative network or conceptual hierarchy, perform simple calculation to find such values as a product of link string relation degrees, and automatically generate relation keywords with a retrieval parameter as a threshold. This method allows the user to better reflect background knowledge consisting of simply-structured data.

BRIEF DESCRIPTION OF THE DRAWINGS

FIG. 4 is a diagram showing an example of a prompt from the retrieval request input section 11 shown in FIG. 1 and an example of data entered in response to the prompt.

FIG. 6 is a diagram showing an example of retrieval data displayed by the relation data acquisition section 12 showsn in FIG. 1 and an example of a relation data inastruction entered in response to the retrieval data.

FIG. 16 is a diagram showing the first generation example of a retrieval expression performed by the retrieval expression generation section 122 showin in FIG. 1.

FIG. 17 is a diagram showing the second generation example of a retrieval expression performed by the retrieval expression generation section 122 shown in FIG. 1.

FIG. 18 is a diagram showing an example of retrieval output from the retrieval result output section 130 shown in FIG. 1.

FIG. 24 shows an example of retrieval request input performed by the retrieval request input section 2210 shown in FIG. 22.

FIG. 27 is a diagram showing an example of retrieval result output from the retrieval result output section 2230 shown in FIG. 22.

DETAILED DESCRIPTION

1. Embodiment 1

1-1. Structure

Figure 1:
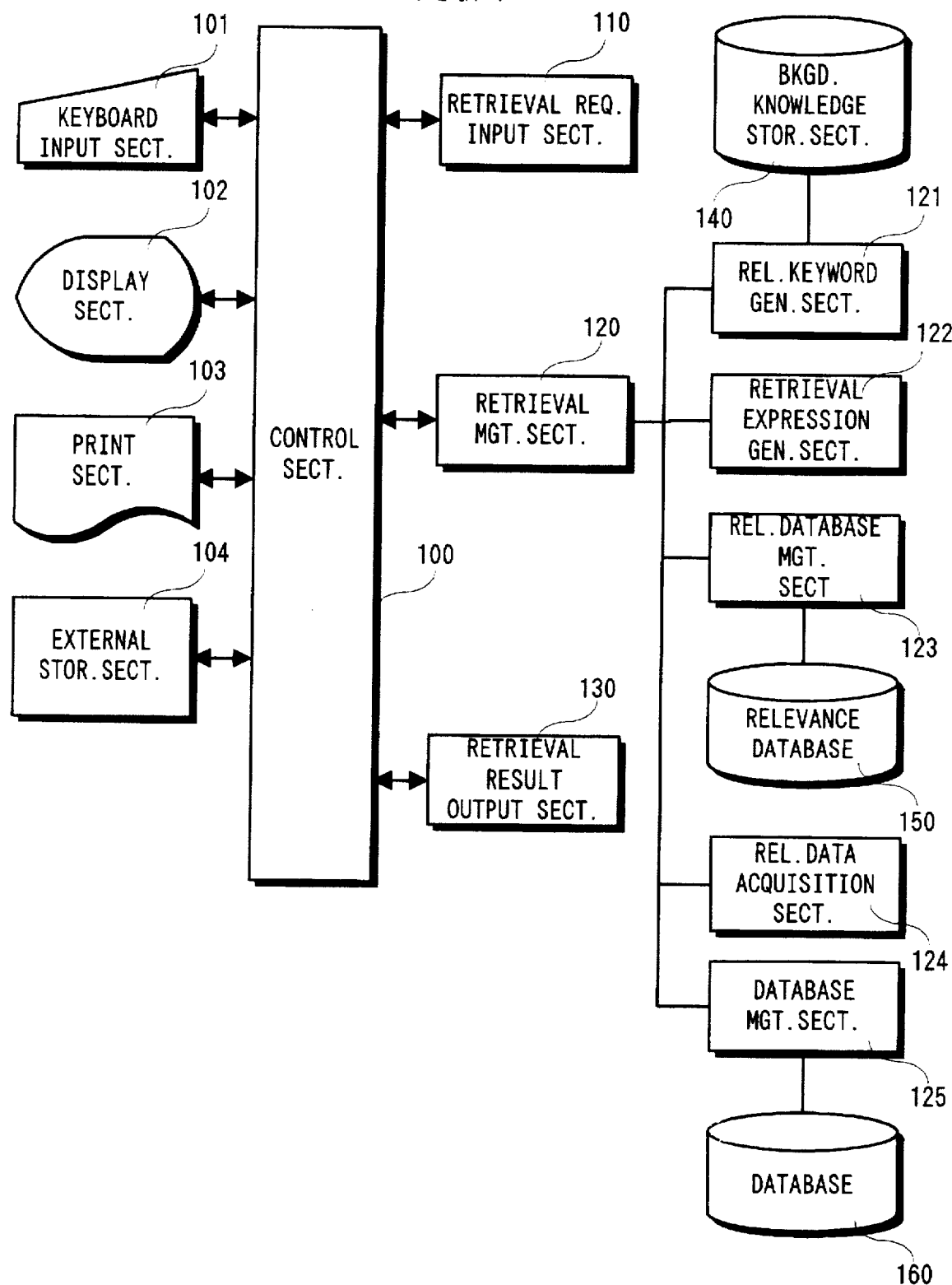
FIG. 1 is a diagram showing an example of the structure of a similar information retrieval system according to this invention.

FIG. 1 is a structure diagram of an embodiment of a similar information retrieval system according to this invention. The control section 100, the kernal of the system which controls the whole structure, consists of a general-purpose micro-computer or a special-purpose LSI. Peripheral devices for input/output or storage are connected to this control section 100: they are the keyboard input section 101, display section 102, print section 103, and external storage section 104. Although not shown in the diagram, lower-level control section for controlling input/output and retrieval are provided in the control section 100. These lower level control sections consist of firmware such as ROM or software programs. This type of hierarchical control structure is not described here because it is well known.

In the system shown in FIG. 1, the retrieval request input section 110, retrieval management section 120, and retrieval result output section 130 are provided to implement the similar information retrieval function introduced by this invention. These are functional sections controlled directly by the control section 100.

In addition, the relation keyword generation section 121, retrieval expression generation section1 22, relevance database management section 123, relation data acquisition section 124 and database management section 125 are provided as the lower-level functional sections of the retrieval management section 120.

The background knowledge storage section 140 shown in this figure contains background knowledge such as conceptual hierarchies and associative networsk. This background knowledge storage section 140 is composed either of firmware such as ROM or of a hard disk. The device 150 in the figure is a database containing relation data obtained by the relation data acquisition section 124. This relevance database 150 is composed of a hard disk. The device 160 shown in the figure is a database containing data to be retrieved. This database 160 is composed of a hard disk.

The functional sections 110, 120, 130, and 121–125 each have the following functions.

First the retrieval request input section 110 reads a retrieval request, including input keywords set up by the user and input keyword importance degrees, under control of the control section 100 when the user enters them at the keyboard input section 101.

The retrieval management section 120 sets up retrieval parameters and, in addition, retrieves data on a trial and error basis via the relation keyword generation section 121, retrieval expression generation section 122, relevance database management section 123, relation data acquisition section 124, and database management section 125. That is, the retrieval management section 120 execute a sequence of operation repeatedly on a trial and error basis; it sets up retrieval parameters, causes the relation keyword generation section 121 to generate relation keywords, causes the retrieval expression generation section 122 and the relevance database management section 123 to automatically generate a similarity retrieval expression satisfying user's retrieval needs, and causes the database management section 125 to execute retrieval. While performing a sequence of operation on a trial and error basis, the retrieval management section receives relation data via the relation data acquisition section 124 and stores it in the relevance database 126.

More specifically, the relation keyword generation section 121 uses background knowledge, stored in the background knowledge storage sections 140, to generate relation keywords from the retrieval request input section 110 with retrieval parameters as thresholds. The retrieval expression generation section 122 uses input keywords and relation keywords to generate a retrieval expression. The relevance database management section 123 manages the relevance database 150; for example, it stores data in the relation data acquisition section 124, receives data from the user into the relavance database 150 and retrieves relation data satisfying a retrieval expression from the relevance database 150. The database management section 125 uses a retrieval expression generated by the retrieval expression generation section 122 to retrieve data from the database 160. The relation data acquisition section 124 gets some data samples from data retrieved by the database management section 125, presents them to the user and, if there are one or more data items which are instructed by the user as relation data, cells the relevance database management section 125 to store this relation data into the relevance database 150. The retrieval management section 120 calls the relevance database management section 123 to generate retrieval parameters according to the data contents stored in the relevance database 150, calls the relation keyword generation section 121 to generate relation keywords with retrieval parameters as thresholds, and calls the retrieval expression generation section 122 to generate a retrieval expression using input keywords and relation keywords.

On the othe rhand, the retrieval result output section 130 outputs final retrieval results obtained by the retrieval management section 120. This retrieval result is output, as necessary, to the display section 102, print section 103, and external storage section 104 by the control section 100.

1-2. Operation

Figure 2:
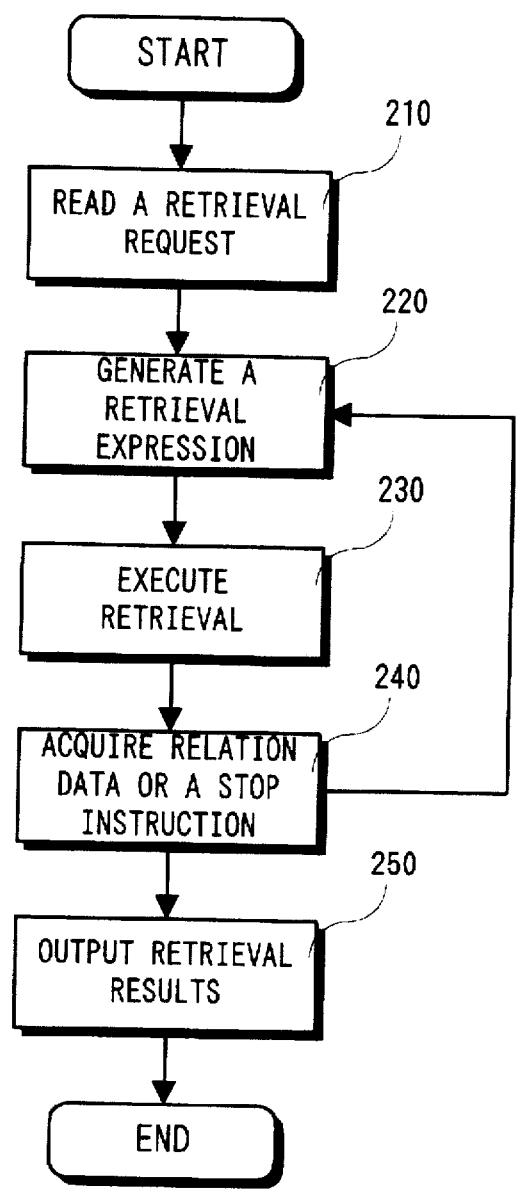
FIG. 2 is a flowchart showing the outline of a trial-and-error-basis similar information retrieval processing of the system shown in FIG. 1.

1-2-1. Outline of Similar Information Retrieval Processing on a Trial and Error Basis FIG. 2 is a flowchart which outlines tiral-and-error-basis similar information retrieval processing of the system used in this embodiment. As shown in FIG. 2, trial-and-error-basis similar information retrieval processing starts by reading a retrieval request, which includes input keywords and input keyword importance degrees set up by the user, from the retrieval request input section 110, (step 210).

Then, the retrieval management section 120 generates a retrieval expression (step 120), execute retrieval (step 230), and acquires relation data or a stop instruction (step 240). In step 220 where a retrieval expression is generated, the relation keyword generation section 121, retrieval expression generation section 122, and relevance database management section 123 work together to generate a retrieval expression which is likely to satisfy the user's retrieval strategy. In step 230 where the retrieval expression is executed, the retrieval management section uses the retrieval expression generated in step 220 to retrieve data from the database 160 via the database management section. In step 240 where relation data is acquired, the relation data acquisition section 124 acquires one or more retrieval data samples from the temporary retrieval results stored in the database 160 and presents them to the user. If the user enters a relation data instruction, the relevance database management section 123 stores this relation data into the relevance database 150. And, when relation data is acquired in this manner, control goes back to step 220, and, based on this relation data, a retrieval expression is generated.

If the user enters a retrieval processing stop instruction is step 240, the retrieval management section 120 determines that the data presented to the user is the final result, and sends it to the retrieval result output section 130. Then, the retrieval result output section 130 outputs a data group that is the final result obtained by the retrieval management section 120 in an appropriate format (step 250).

1-2-2. Structure of Data and Background Knowledge

Figure 3:
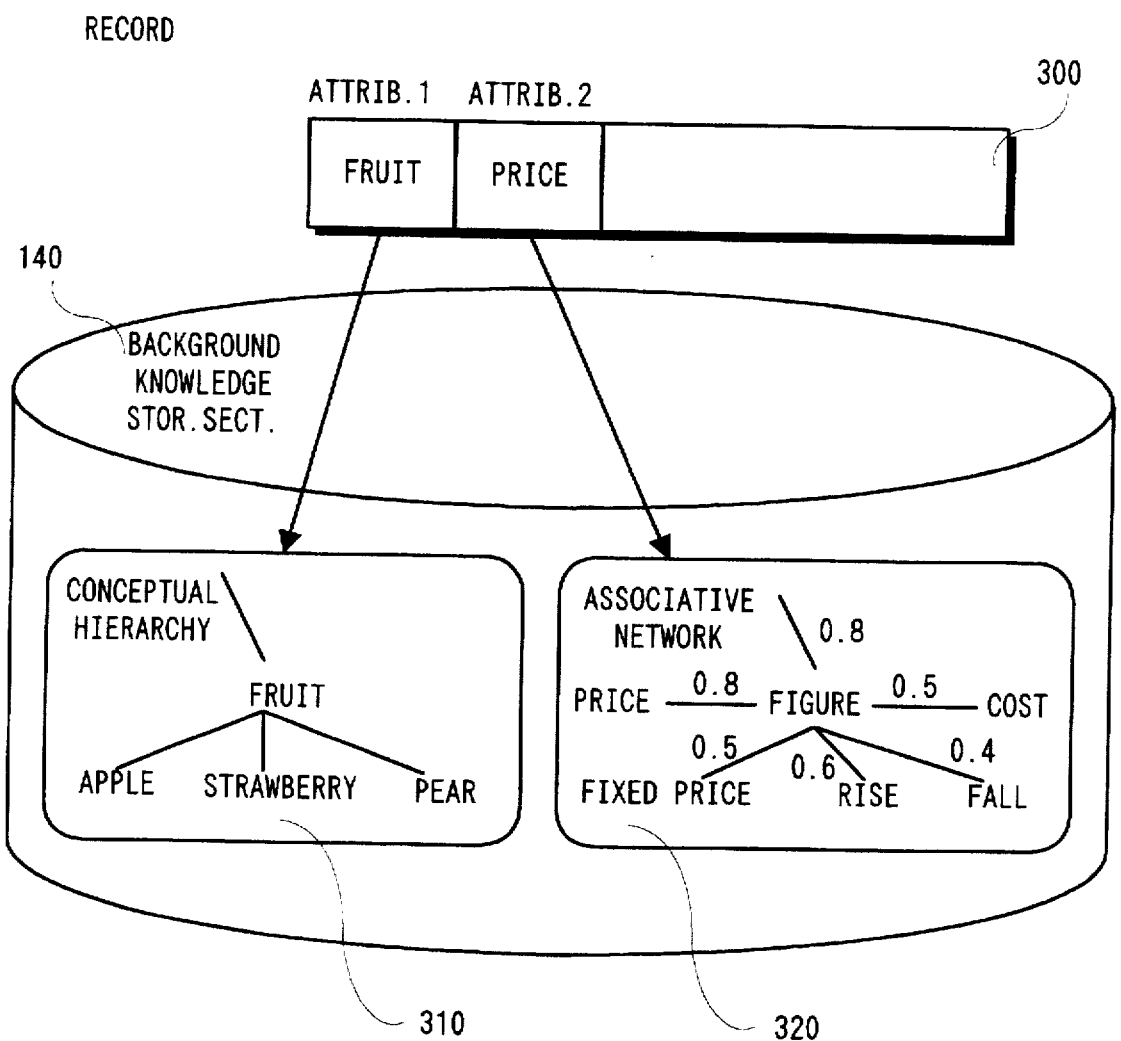
FIG. 3 is a diagram showing an example of data stored in the database 160 shown in FIG. 1 and an example of knowledge stored in the background knowledge storage section 140.

FIG. 3 shows an example of a data item (record 300) to be retrieved that is stored in the database 160 as well as an example of knowledge data such as the conceptual hierarchy 310 and the associative networor 320 that are stored in the background knowledge storage section 140. In this figure, a record 300 (or a case) to be retrieved is represented by a set of attribute values (or fields). Each attribute corresponds to one column of a record stored in the database 160, while the case is represented as one record in the database 160.

In this example, the attributes value "fruit" is assigned to the attribute 1 of the record 300, and the attribute value "figure" is assigned to the attribute 2. The backgrond knowledge storage section 140 contains the conceptual hierarchy 310 of the attribute 1 as the background knowledge corresponding to the attribute 1 and, in the conceptual hierarchy 310, there are low level attribute values—"apple", "strawberry", and "pear"—of the attribute value "fruit". In addition, the background knowledge storage section contains the associative network 320 of the attribute 2 as the background knowledge corresponding to the attribute 2. In this associative network 320, background knowledge describing the relation degrees between keywords is embedded: for example, the relation value between "figure" and "price" is "0.8", and the relation value between "figure" and "fixed price" is "0.5". This relation degree ranges from 0 to 1. In this example, attributes 1 and 2 have associated background knowledge; however, not all attributes have corresponding knowledge. The system uses background knowledge stored in the background knowledge storage section to execute trial-and-error-basis similar information retrieval.

1-2-3. Retrieval Request Input Processing

FIG. 4 is an example of retrieval request input processing (step 210 in FIG. 2) performed by the retrieval request input section 110. More specifically, it shows a prompt message displayed on the display section 102 and data items entered in response to the prompt.

As shown in FIG. 4, the retrieval request input section 110 reas a retrieval request consisting of an attribute, the value of the attribute (keyword), and its importance degree. In this example, the retrieval request input section 110 displays a prompt "Enter input keywords and importance degrees" on the display section 102. In response to this prompt, the user enters a retrieval request at the keyboard input section 101; that is, he enters the input keyword "strawberry" and its importance value 0.7 for attribute 1, and the input keyword "figure" and its importance degree 0.8 for attribute 2. Entered data is displayed on the display section 102.

1-2-4 Retrieval Expression Generation Processing

Figure 5:
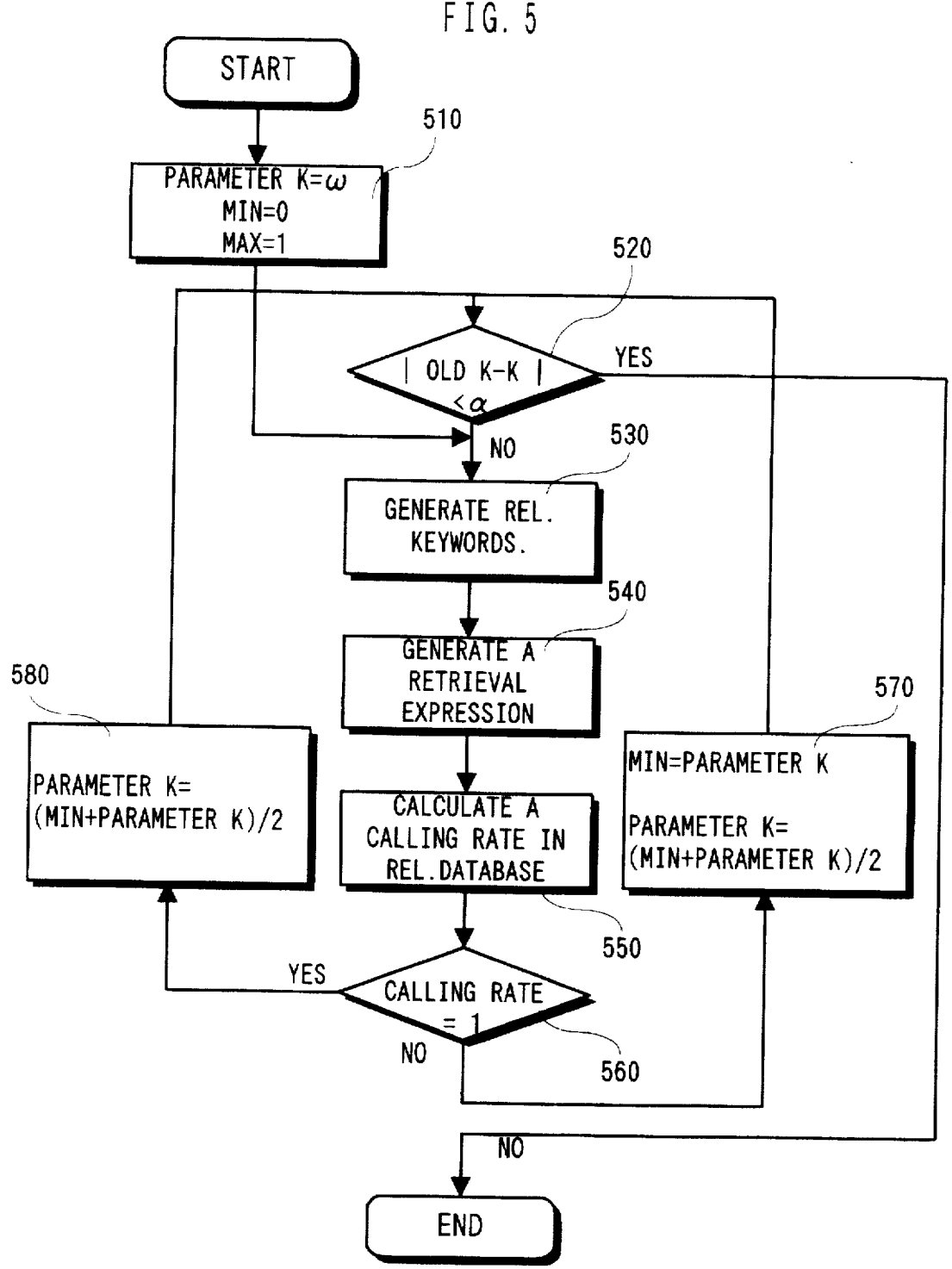
FIG. 5 is a flowchart showing retrieval expression generation processing performed by the the retrieval management section 120 shown in FIG. 1.

FIG. 5 is a detailed flowchart showing the retrieval expression generation processing (step 220 in FIG. 2) performed by the retrieval management section 120 which is the kernal of the system i this embodiment.

In this retrieval expression generation processing the retrieval management section initializes the retrieval parameter K and the maximum and the minimum values of this retrieval parameter K (step 510), adjusts the retrieval parameters according to the calling rate of a retrieval expression generated by this retrieval parameter K, and then determines whether or not the retrieval parameter K has converged (step 520). If it is determined in step 520 that the retrieval parameter K has converged, the retrieval management section stops the retrieval expression generation processing. Step 510 corresponds to the first initialization processing in step 220 in FIG. 2; from the second time on, the pre-set values are used unchanged.

After initialization processing in step 510 is finished or if the parameter change in step 520 is equal to or greater than the constant α, the relation keyword generation section 121 generates a relation keyword with the use of this retrieval parameter K (step 530), and the retrieval expression generation section 122 generate a retrieval expression (step 540). Then, the relevance database management section 123 calculates a calling rate in the relevane database 150 (step 550). Depending upon the calculated calling rate, the system modifies the value of retrieval parameters K in a manner similar to the binary search method (step 560, step 570, or step 580), and continues the modification of the retrieval expression.

This retrieval parameter K represents how restrictive the retrieval condition is. That is, as the value of the retrieval parameter K is closer to 1, the retrieval condition becomes more restrictive and the number of data items retrieved from the database 160 becomes smaller. Conversely, as the value of the retrieval parameters K is closer to o, the retrieval condition becomes less restrictive and the number of data items retrieved from the database 160 becomes larger. Thus, the retrieval parameter K can be used to improve a condition that is too restrictive or that is too non-restrictive.

Retrieval expression generation processing via the retrieval management section 120 will be described in further detail by referring to FIG. 5.

First, the retrieval management section 120 sets the initial value ω of the retrieval parameter K (in this case, ω=0), and also sets the minimum and the maximum values of the retrieval parameters to 0 and 1, respectivel (step 510). Then, the retrieval management section 120 causes the relation keyword generation section 121 to generate a keyword, related with the user-entered input keyword, as a relation keyword (step 530). This relation keyword is generated in a location near the input keyword with the value of the retrieval parameter K as teh threshold. In addition, the retrieval management section 120 causes the retrieval expression generation section 122 to generate a retrieval expression in the form of a Boolean expression based on the input keyword and the relation keyword (step 540).

Then, the retrieval management section causes the relevance database management section 123 to retrieve data from the relevance database 150 using the retrieval expression generated in step 540, and calculates a calling rate (step 550). This calling rate is obtained by dividing the number of data items (A) stored in the relevance database 150 by the number of data items (B) retrieved by the etrieval expression. As described before, it is desirable that the calling rate be as close as the maximum value of 1. However, because there is a tradeoff between a call value and a precision value, another information retrieval criterion, it is difficult ot set these two values to 1 at the same time. Therefore, in FIG. 5, a check is made to use if the calling rate is 1 (step 560). If the calling rate is not 1 (O<K<1), the value of the retrieval parameter K is increased to leave the restrictive condition, assuming that the condition is too restrictive (step 570). If the calling rate is 1, the value of the retrieval parameter K is decreased to leave the non-restrictive condition, assuming that the condition is not too restrictive (step 580).

More specifically, in step 570, the value of the retrieval parameter K is assigned to the minimum value of the retrieval parameter K, and the medium value between the value of the retrieval parameter K and the maximum value of the retrieval parameter K is assigned to the retrieval parameter K. For example, if the initial value ($\omega$) of the retrieval parameter K is 0.5, the value of the retrieval parameter K is changed to 0.75 and the minimum value of the retrieval parameter K is changed to 0.5. This means that the value of the retrieval parameter K will never drops below 0.5.

In addition, in step 580, the medium value between the value of the retrieval parameter K and the minimum value of the retrieval parameter K is assigned to the retrieval parameter K. For example, if the initial value ($\omega$) of the retrieval parameter K is 0.5, the value of the retrieval parameter K is changed to 0.25.

After changing the value of the retrieval parameter K, the retrieval management section 120 determines whether or not this retreival parameter K satisfies the stop condition (step 520). That is, by comparing the change in the value of the retrieval parameter K (difference between the old value before change and the value of the retrieval parameter K after change) with the constant $\alpha$, the retrieval management section determines whether the retrieval parameter K has converged. If the change in the value of the retrieval parameter K is greater than the constant $\alpha$ in step 520, the retrieval management section regards the retrieval expression generated by the retrieval parameter K as the final retrieval expression, and stops retrieval expression generation processing. Conversely, if the change in the value of the retrieval parameter K is less than the constant $\alpha$ in step 520, control is passed to step 530.

1-2-5 Retrieval Data Presentation and Relation Data Acquisition

FIG. 6 is an example of retrieval data presentation and relation data acquisition performed by the relation data acquisition section 124 (step 240 in FIG. 2). It shows an example of retrieved data displayed on the display section 102 and a relation data instruction entered by the used in response to the displayed data.

As shown in FIG. 6, the relation data acquisition section 124 acquires some samples from a set of retrieved records (300 in FIG. 3) and displays them on the display section 102.

In this example, the relation data acquisitioon section 124 displays a prompt "Select related items from those given below" and, at the bottom of the screen, four records. In response to this prompt and displayed records, the user enters "1 3" as a relation data instruction at the keyboard input section 101 to indicate that the first and third records are relation data items, and this relation data indication is displayed on the display section 102. This relation data instruction, which is based on the user's judgment on the relation, is interpreted as the user's retrieval strategy.

Figure 7:
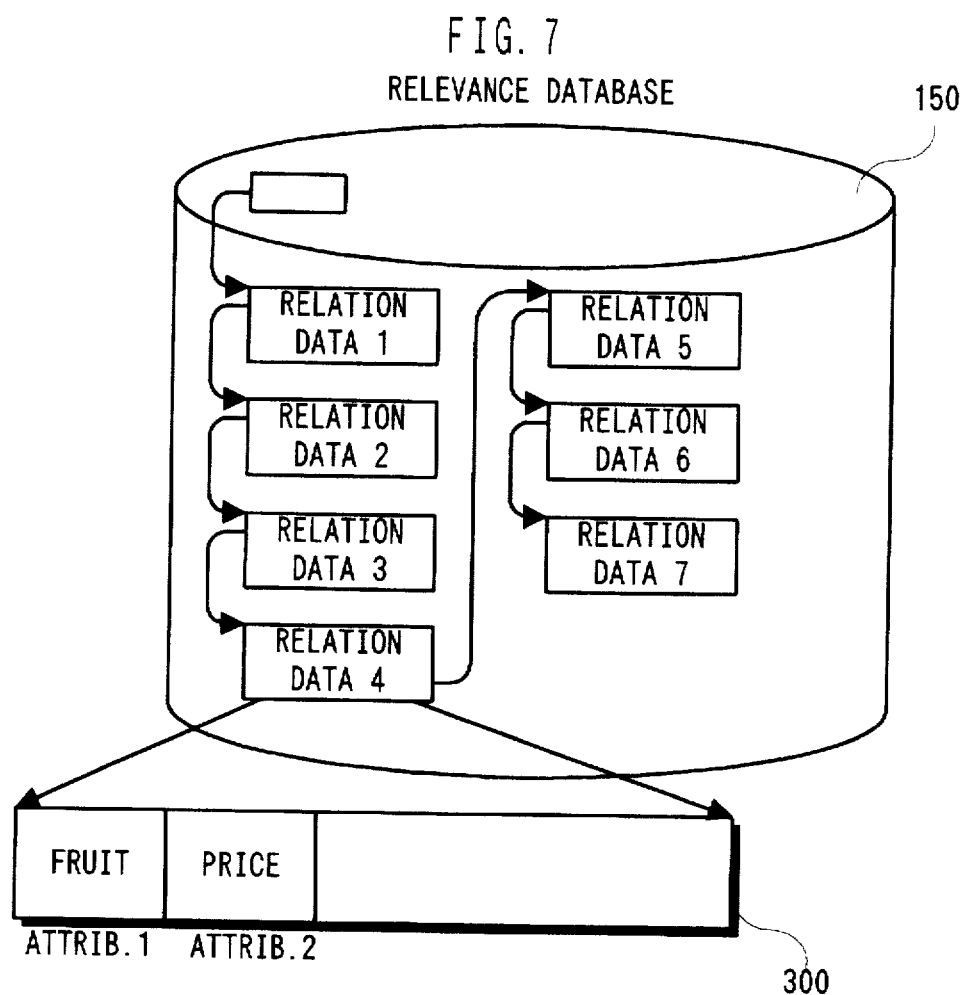
FIG. 7 is a diagram showing an example of data stored in the relevance database 150 shown in FIG. 1.

A relation data instruction, if entered by the user, causes the relation data acquisition section 124 to call the relevance database management section 125 to store user-instructed relation data in the relevance database 150. FIG. 7 shows an example of data (record 300) stored in the relevance database 150. Record 300 shown in FIG. 7 is represented in the same format as record 300 (FIG. 3) stored in the database 160. Once the relation data acquisition section 124 acquires relation data, the retrieval management section 120 changes the retrieval parameter value according to this relation data and passes control back to the retrieval expression generation processing step (step 220 in FIG. 2).

At this time, if the user judge that all the displayed records are relation data and is satisfied with them, or if the user wnats to end retrieval, he enters the stop instruction END. Then, the trial-and-error retrieval expression generation loop (steps 220, step 230, and step 240) ends and, in step 250, the records presented in step 240 are output as the final retrieval result.

Figure 8:
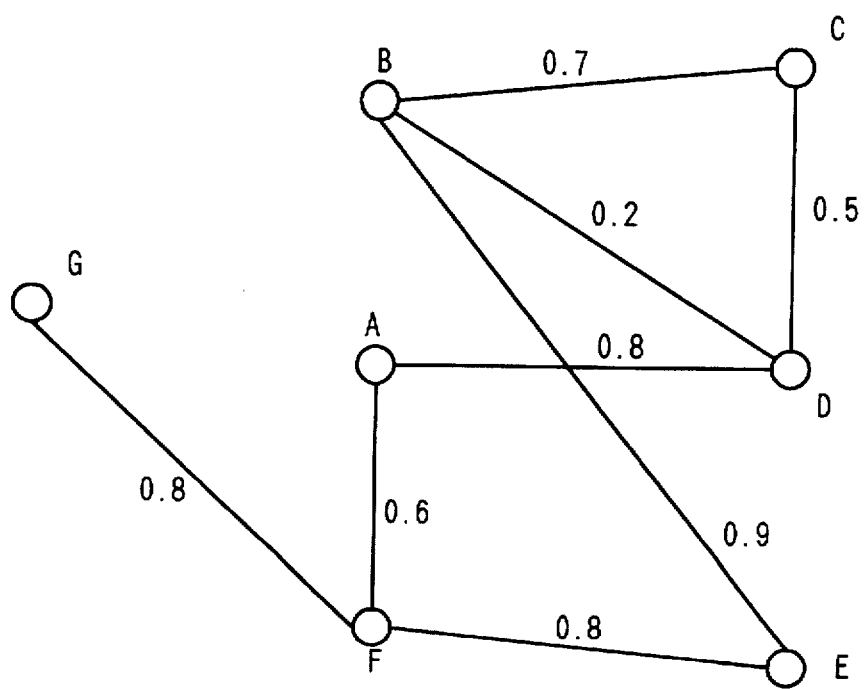
FIG. 8 is a diagram showing an example of an associative network stored in the background knowledge storage section 140 shown in FIG. 1.

1-2-6. Relation Keyword Generation Processing 1-2-6-1 Associative Network Structure FIG. 8 is an example of an associative network (320 in FIG. 3) which is one of the background knowledge representations stored in the background knowledge storage section 140. The user stores this type of associative network in the background knowledge storage section 140 for data attributes stored in the database 160. In the example shown in FIG. 3, keywords such as "figure", "price", and "fixed price" are linked with each other with a relation degree assigned to a link between each two keywords. In FIG. 8, each keyword is represented by a symbol (A, B, C, etc.) for convenience. In FIG. 8, keyword A is linked to keywords D and F with the relation degrees 0.8 to 0.6 assigned respectively. Likewise, keyword D is linked to keywords B and C with relation degrees 0.2 to 0.5 assigned. This relation degree, 0 to 1, becomes larger as the relation between two keywords is closer.

Here, the relation degree between indirectly-linked keywords is defined as follows:

Definition 1

$$Rel(i,j) = \max\{R_k | R_k = L\omega1_k \times L\omega2_k \times L\omega3_k \times \ldots \times L\omega n_k\}$$

In definition 1, Rel(i,j) indicates the relation degree between a keyword "I" and a keyword "J", and Lwik indicates the relation degree on the associative network 320 that is obtained when the link is established through the keywords "I" and "J". That is, Rel(i,j) is the function which returns to the maximum product of the relation degrees when the link is established through keywords "I" to "J". For example, to calculate the relation degree of the keyword A and the keyword B, there are the following link strings:

A→F→E→B
A→D→B
A→D→C→B

From these link strings, the link relation degree products are calculated as follows:

0.6×0.8×0.9=0.432
0.8×0.2=0.16
0.8×0.5×0.7=0.28

Therefore, out of three products 0.432, 0.16, and 0.28, the maximum value of 0.432 is returned. That is, the value of 0.432 is obtained as the relation degree of the keyword A and keyword B based on the relation degree calculation as defined in definition 1.

The relation degree of indirectly-linked keywords can also be defined as follows:

Definition 2

$$Rel(i,j) = \Sigma_s R_k : S = \{R_k | R_k = L\omega 1_k \times L\omega 2_k \times L\omega 3_k \times \ldots \times L\omega n_k\}$$

In definition 2, Rel(i,j) indicates the relation degree between a keyword "I" and a keyword "J", and Lwik indicates the relation degree on the associative network 320 that is obtained when the link is established through keywords "I" and "J". That is, Rel(i,j) is the function which returns the sum of the products of the relation degrees when the link is established through keywords "I" to "J". For example, to calculate the relation degree of the keyword A and the keyword B, there are the following link strings:

A→F→E→B
A→D→B
A→D→C→B

From these link strings, the link relation degree products are calculated as follows:

0.6×0.8×0.9=0.432
0.8×0.2=0.16
0.8×0.5×0.7=0.28

Therefore, the sum (0.872) of these products 0.432, 0.16, and 0.28 is returned. That is, the value of 0.872 is obtained as the relation degree of the keyword A and the keyword B based on the relation degree calculation method as defined in definition 2. When calculating the relation degree between keywords from the sum of the products of the relation degrees on the link string through which a link is established, the user can generate hidden keywords that are better suited to the user's retrieval strategy by establishing a plurality of links from a keyword to increase propagation. When this method is used, abstract retrieval requests in terms of such factors as similarity or view may also be handled.

1-2-6-2 Relation Keyword Generation Based on Relation Degree Calculation According to Definition 1

Figure 9:
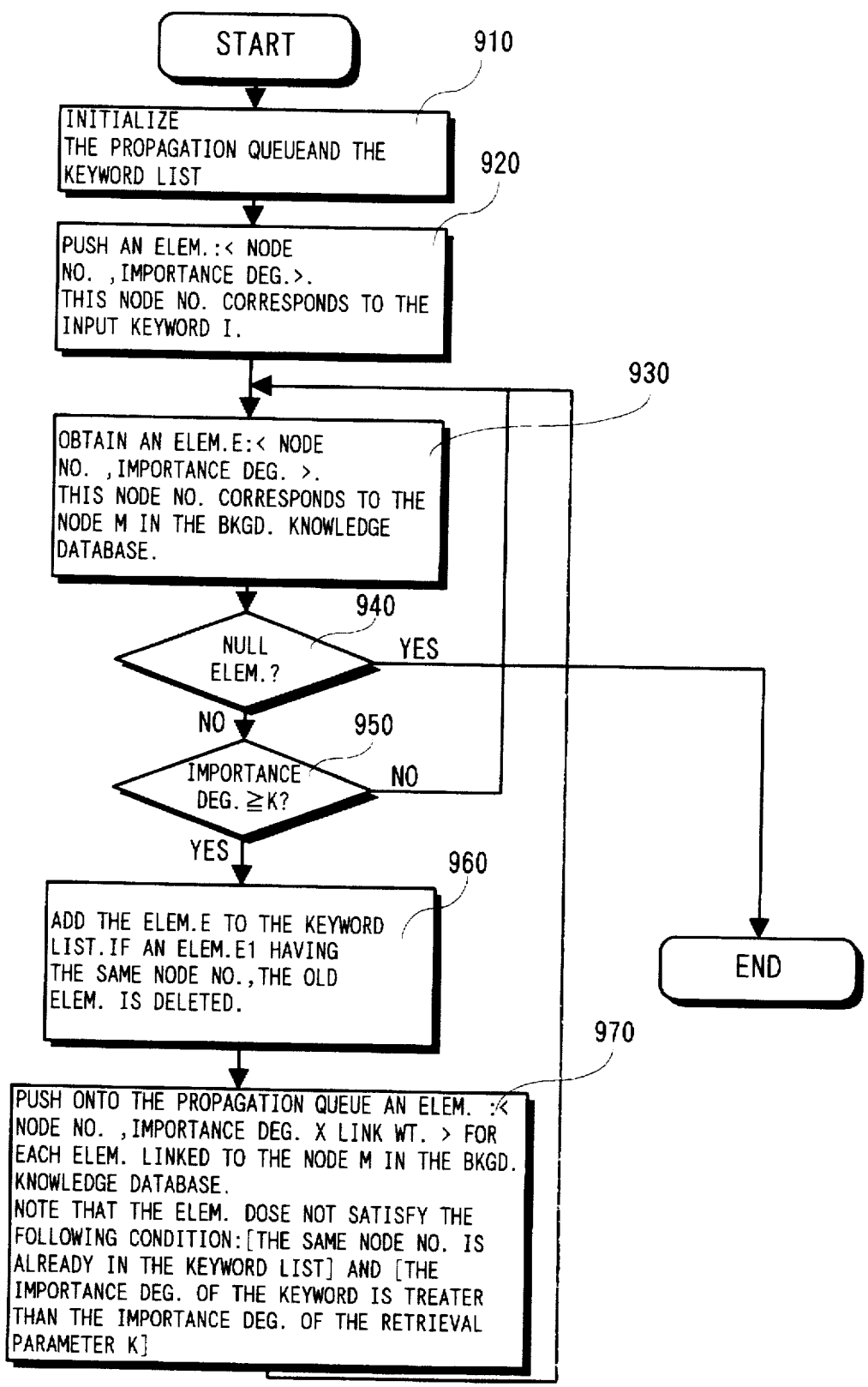
FIG. 9 is a flowchart showing relation keyword generation processing based on definition 1 relation degree calculation method performed by the relation keyword generation section 121 shown in FIG. 1.

FIG. 9 is a flowchart showing the relation keyword generation processing performed by the relation keyword processing section 121 according to the relation degree calculation method as defined in definition 1. In this relation keyword generation processing, a relation keyword larger than the retrieval parameters K, which is the threshold, is generated from a user-entered input keyword (step 530 in FIG. 5). The propagation queue and the keyword list are initialized based on the propagation algorithm (step 910), the input keyword which is initial propagation data is pushed onto the propagation queue (step 920), and then a sequence of steps in the propagation loop are repeated.

In this propagation loop, a sequence of steps are performed as follows: A node is obtained from the propagation queue (step 930) and, if this node is not null (step 940) and if the importance degree of the node is equal to or greater than the retrieval parameter K (step 950), this node is added to the keyword list (step 960) and each node linked to this node is pushed onto the propagation queue (step 970). By repeating the propagation loop until a null node is obtained, relation keywords can be obtained in the form of a keyword list. The relation keyword generation section 121 performs this processing for each attribute having background knowledge and generates relation keywords for each attribute having the background knowledge.

Referring to FIG. 9, relation keyword generation processing performed by the relation keyword generation section 121, which is based on the relation degree calculation method as defined in definition 1, will be described in further detail. First, the relation keyword generation section 121 initializes the propagation queue and keyword list to make the queue and the list null (step 910). After initialization, an element, which is a pair consisting of a node number indicating the ID of an input keyword and its importance degree, is pushed onto the propagation queue (step 920). If there is a plurality of input keywords, each of the element corresponding to those input keywords are pushed onto the queue.

Next, the relation keyword generation section 121 enters the propagation loop, obtains an element E from the propagation queue (step 930), and determines if this element E is null (step 940). If the element E is null, the relation keyword generation section 121 returns the keyword list as the answer and ends processing. In this case, the element E corresponds to an node indicating the keyword M. If the element E is not null, a check is made to see if the importance degree is equal to or greater than the retrieval parameter K (step 950). If the importance degree is less than the retrieval parameter K, control is passed back to the propagation queue read processing (step 930); otherwise, the element E is added to the keyword list (step 960). In case an element having the same keyword already exists in the keyword list, the old element E1 existing in the keyword list is removed.

Then, the relation keyword generation section 121 pushes onto the propagation queue an element <node umber, the important degree of node N=importance degree of element E×relation degree of the link from node M to node N> for each node directly linked to node M stored as background knowledge (step 970), and returns control to the propagation queue read processing (step 930). Note that, when the keyword list contains an element of the same node and its importance degree a larger than that of the new element, the new element is not pushed onto the propagation queue.

In the above processing, the weight of the relation keyword is calculated from the weight of the input keyword. The calculation to find a relation degree is done by the function Rel(i,j) in definition 1. That is, suppose that the importance degree of the input keyword I is Wi and that the relation degree of the keyword J, which is not an input keyword, is Rel(i,j), the importance degree of the keyword J is calculated as Wi×Rel(i,j).

1-2-6-3 Relation Keyword Generation Based on Relation Degree Calculation According to Definition 2

Figure 10:
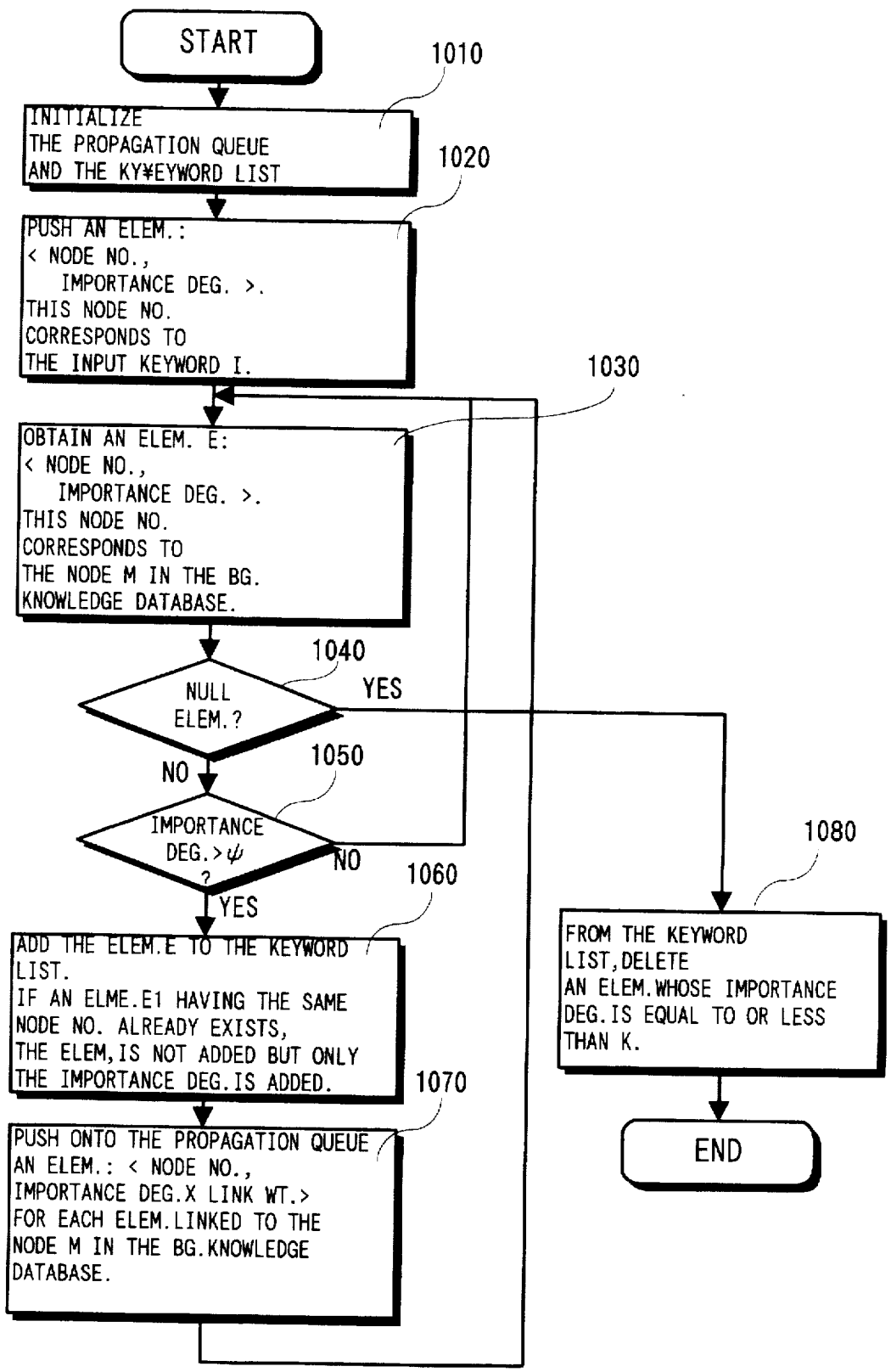
FIG. 10 is a flowchart showing relation keyword generation processing based on definition 2 relation degree calculation method performed by the relation keyword generation section 121 shown in FIG. 1.

FIG. 10 is a flowchart showing the relation keyword generation processing performed by the relation keyword processing section 121 according to the relation degree calculation method as defined in definition 2. In this relation keyword generation processing, a relation keyword larger than the retrieval parameter K, which is the threshold, is generated from a user-entered input keyword (Step 530 in FIG. 5). The propagation queue and the keyword list are initialized based on the propagation algorithm (step 1010), the input keyword which is initial propagation data is pushed onto the propagation queue (step 1020), and then a sequence of steps in the propagation loop are repeated.

In this propagation loop, a sequence of steps are performed as follows: A node is obtained from the propagation queue (step 1030) and, if this node is not null (step 1040) and if the importance degree of the node is greater than the propagation value ψ (step 1050), this node is added to the keyword list (step 1060) and each node linked to this node is pushed onto the propagation queue (step 1070). By repeating the propagation loop until a null node is obtained, relation keywords can be obtained in the form of a keyword list. The relation keyword generation section 121 performs this processing for each attribute having background knowledge and generates relation keywords for each attribute.

Referring to FIG. 10, relation keyword generation processing performed by the relation keyword generation section 121, which is based on the relation degree calculation method as defined in definition 2, will be described in further detail. First, the relation keyword generation section 121 initializes the propagation queue and keyword list to make the the queue and the list null (step 1010). After initialization, an element, which is a pair consisting of a node number indicating the ID of an input keyword and its importance degree, is pushed onto the propagation queue (step 1010). If there is a plurality of input keywords, each of the elements corresponding to those input keywords are pushed onto the queue.

Next, the relation keyword generation section 121 enters the propagation loop, obtains an element E from the propagation queue (step 1030), and determines if this element E is null (step 1040). If the element E is null, the relation keyword generation section 121 deletes elements whose importance degree is smaller than the retrieval parameters K (step 1080) returns it as the answer, and ends processing. In this case, the element E corresponds to an node indicating the keyword M. If the element E is not null, a check is made to see if the importance degree is greater than the pre-set propagation value ψ (step 1050). If the importance degree is equal to or less than the propagation value ψ, control is passed back to the propagation queue read processing (step 1030); otherwise, the element E is added to the keyword list (step 1060). In case an element having the same keyword already exists in the keyword list, the new element is not added to the keyword list and only the importance degree is added.

Then, the relation keyword generation section 121 pushes onto the propagation queue an element <node number, the important degree of node N=importance degree of element × Exrelation degree of the link from node M to node N> for each node directly linked to the node M stored as background knowledge (step 1070), and returns control to the propagation queue read processing (step 1030).

In the above processing, the weight of the relation keyword is calculated from the weight of the input keyword. The calculation to find a relation degree is done by the function Rel(i,j) in definition 2. That is, suppose that the importance degree of the input keyword I is Wi and that the relation degree of the keyword J, which is not an input keyword, is Rel(i,j), the importance degree of the keyword J is calculated as Wi×Rel(i,j).

As described above, the relation keyword generation section 121 calculates relation keywords in both definition 1 and definition 2 using the similar propagation algorithm. In the following discussion, definition 1 is used as the calculation formula for the relation degree Rel(i,j) between keywords.

Figure 11:
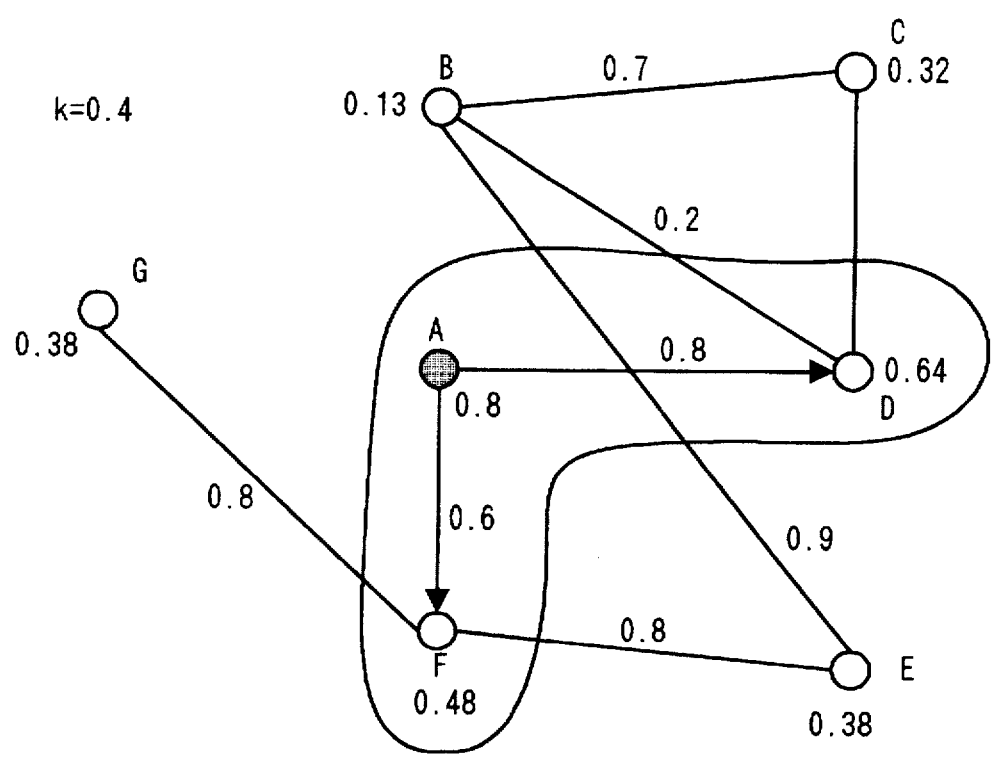
FIG. 11 is a diagram showing the first generation example of relation keyword performed by the relation keyword generation section 121 shown in FIG. 1.

1-2-6-4 First Example of Relation Keyword Generation Using a Associative Network FIG. 11 shows the first example of relation keyword generation via the relation keyword generation section 121.

It shows an example in which relation keywords are generated using the associative network, shown in FIG. 8, as background knowledge.

First, assume that the input keyword is A, that its importance degree is 0.8, and that the value of the retrieval parameter K is 0.4. In this case, the element <A 0.8> is pushed onto the propagation queue (step 920 in FIG. 9), where A indicates the node number. In the propagation loop, the element <A, 0.8> is obtained (step 930 in FIG. 9). Because the importance degree of this element 0.8 is greater than the value of the retrieval parameters K (step 950 in FIG. 9), this element <A, 0.8> is added to the keyword list (step 960 in FIG. 9). Then, processing is propagated to the keywords D and F which are directly linked to the input keyword A, and element <D, 0.64=0.8×0.8> and <F, 0.48=0.8×0.6> are pushed onto the propagation queue (step 970 in FIG. 9).

Next, control goes back to the start point of the propagation loop, and the new element <D, 0.64> is obtained (step 930 in FIG. 9). Because the importance degree of this element 0.64 is greater than 0.4 that is the value of the retrieval parameter K (step 950 in FIG. 9), this element <D, 0.64> is added to the keyword list (step 960 in FIG. 9). In addition by performing propagation processing for this element <D, 0.64>, the keyword B and C directly linked to the keyword D are affected and the elements <B, 0.13=0.64× 0.2> and <C 0.32=0.64×0.5> are pushed onto the propagation queue (step 970 in FIG. 9). After that, the new element <F, 0.48> is obtained from the propagation queue (step 930 in FIG. 9). Because the importance degree of this element 0.48 is greater than 0.4 which is the value of the retrieval parameter K (step 950 in FIG. 9), this element <F, 0.48> is added to the keyword list (step 960 in FIG. 9). In addition, by performing propagation processing for this element <F, 0.48>, the keyword E and G directly linked to the keyword F are affected and the elements <E, 0.38=0.48×0.8> and <G, 0.38=0.48×0.8> are pushed onto the propagation queue (step 970 in FIG. 9).

Control goes back to the start point of the propagation loop, and the new element <B, 0.13> is obtained from the propagation queue. Because the importance degree of this element 0.13 is less than 0.4 which is the value of the retrieval parameter K (step 950 in FIG. 9), control goes back to the start point of the propagation loop. Because the importance degree of each of the remaining elements <C, 0.32>, <E, 0.38>, and <G, 0.38> is less than 0.4 which is the value of the retrieval parameter K (step 950 in FIG. 9), control goes back to the start of the propagation loop.

As a result of a sequence of steps in the above propagation loop, only three keywords, shown below, are stored in the keyword list and the other keywords are discarded:

(<A, 0.8>,
<D, 0.64>,
<F, 0.48>)

This keyword list indicates that the following relation keywords are obtained when the value of the retrieval parameter K is 0.4 and the importance degree of the input keyword A is 0.8.

(D,F)

Figure 12:
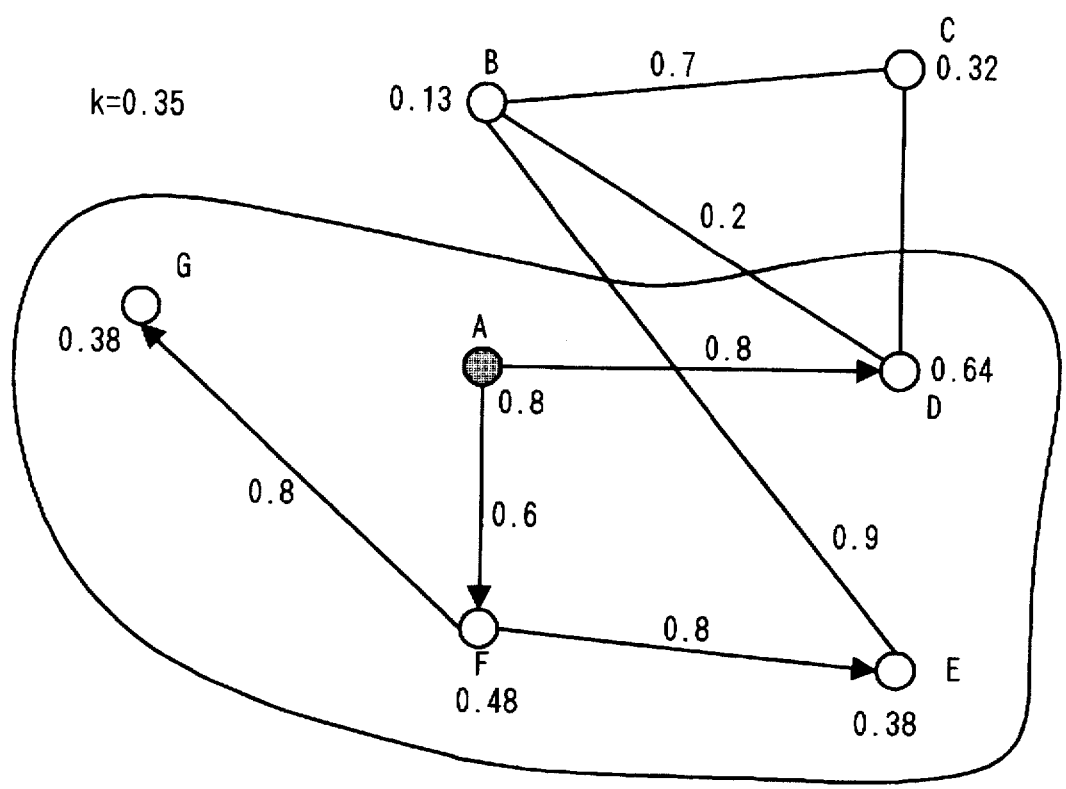
FIG. 12 is a diagram showing the second generation example of relation keywords performed by the relation keyword generation section 121 shown in FIG. 1.

1-2-6-5 Second Example of Relation Keyword Generation Using a Associative Network FIG. 12 shows the second example of relation keyword generation via the relation keyword generation sections 121. As with the first example of generation described above, it shows an example in which relation keywords are generated using the associative network, shown in FIG. 8, as background knowledge. First, assume that the input keyword is A, that its importance degree is 0.8, and that the value of the retrieval parameter K is 0.35. As with the first example of generation described above, the propagation loop is repeated and, as a result, the following five keywords are stored in the keyword list and the other keywords are discarded:

(<A, 0.8>,
<D, 0.64>,
<F, 0.48>,
<E, 0.38>,
<G, 0.38>)

This keyword list indicates that the following relation keywords are obtained when the value of the retrieval parameter K is 0.35 and the importance degree of the input keyword A is 0.8.

(D,F,E,G)

1-2-6-6 Relation between a Smaller Retrieval Parameter and a Relation Keyword Set Decreasing the value of the retrieval parameter K from 0.4 (first generation example) to 0.35 (second generation example) as described above increases the relation keyword set. Set S1 (the set after increasing the value) includes set S2 (the set before increasing the value) as a subset. This relation is represented as follows:

$$S1 \supseteq S2$$

1-2-6-7. Conceptual Hierarchy Structure

Figure 13:
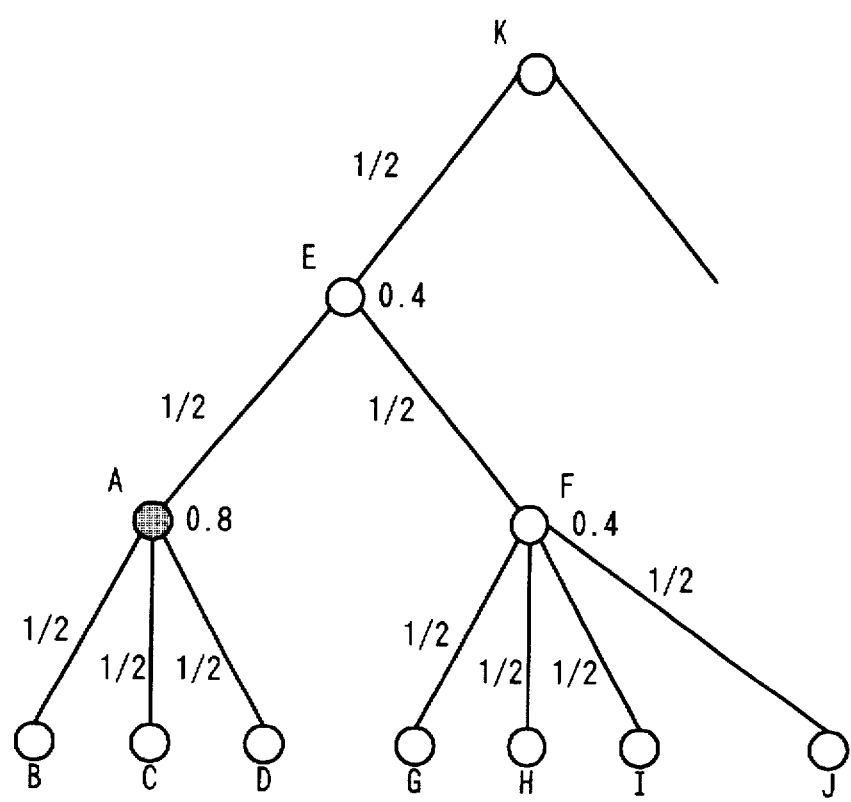
FIG. 13 is a diagram showing an example of conceptual hierarch stored in the background knowledge storage section 140 shown in FIG. 1.

FIG. 13 is an example of a conceptual hierarchy (310 in FIG. 3) which is one of background knowledge representations stored in the background knowledge storage section 140. In the example in FIG. 3, keywords such as "apple", "strawberry", and "pear" are specified as the lower-level concepts of "fruit"; in FIG. 13, keywords are indicated by symbols such as A, B, C, D for convenience. FIG. 13 shows that the keyword E is the higher level concept of the keyword A and that the keywords B, C, and D are the lower-level concepts of the keyword A. In the associative network in FIG. 8, a relation degree between two keywords is indicated; in the conceptual hierarchy FIG. 13, the constant ½ is set as a relation degree between every pair of directly-linked keywords.

The relation degree of two keywords with background knowledge such as shown in FIG. 13 is defined as follows:

Definition 3

$$Rel(i,j)=L\omega i \times L\omega 2 \times L\omega 3 \times \ldots \times L\omega n$$

In definition 3, Rel(i,j) is a relation degree between a keyword "I" and a keyword "J", and Lwi is the relation degree of a conceptual hierarchy link between a keyword "I" and a keyword "J" when they have the common higher-level keywords and the lowest-level keyword among them is "G". That is Rel(i,j) is a function which returns the product of the relation degrees existing between keyword "I" and keyword "J". For example when calculating the relation degree between the keyword B and the keyword G, the common higher-level concepts are the keywords E and K, and the lowest-level keyword of them is the keyword E. In this case, to go from the keyword B to the keyword G (link string), the following route is used:

$$B \rightarrow A \rightarrow E$$

From this link string, the product of the relation degrees of the links is calculated as follows:

$$\tfrac{1}{2} \times \tfrac{1}{2} = \tfrac{1}{4}$$

Figure 14:
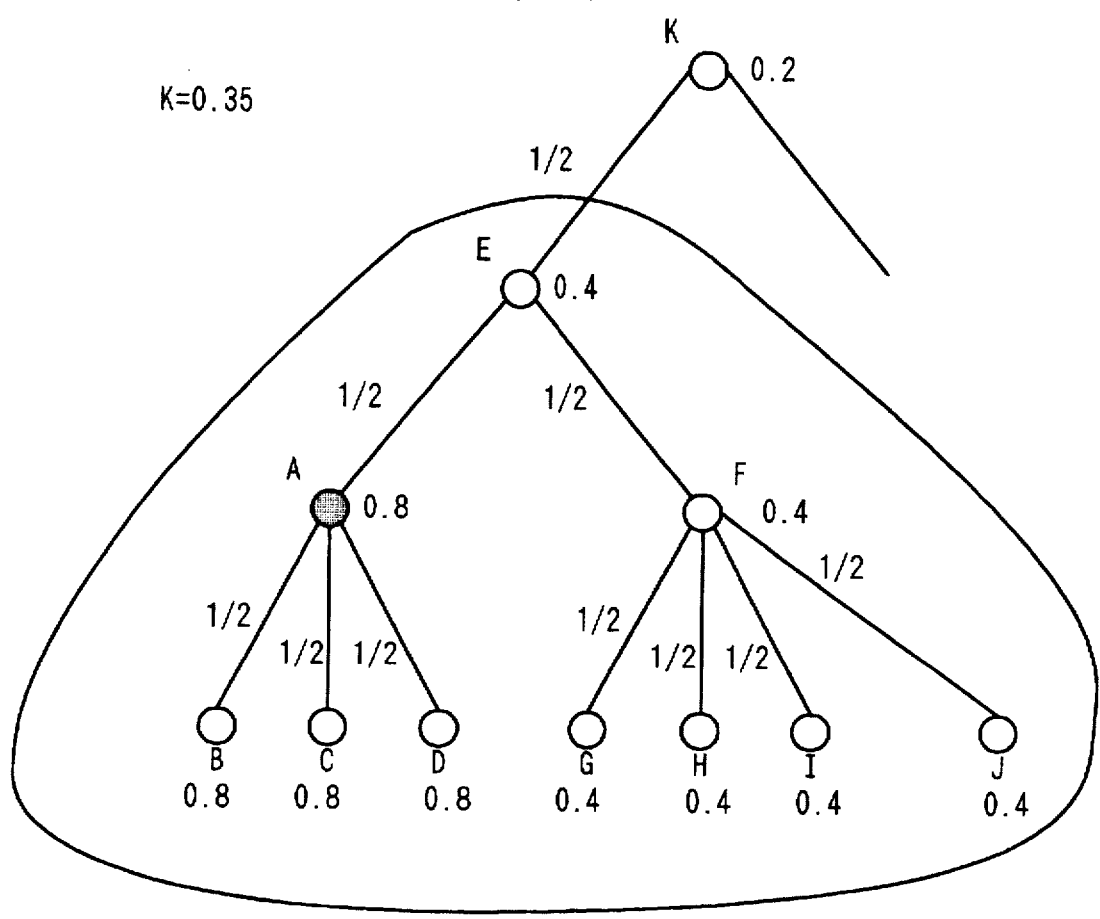
FIG. 14 is a diagram showing the third generation example of relation keywords performed by the relation keyword generation section 121 shown in FIG. 1.

1-2-6-8 Third Example of Relation Keyword Generation Using a Conceptual Hierarchy FIG. 14 shows the third example of relation keyword generation via the relation keyword generation section 121. It shows an example in which relation keywords are generated using the conceptual hierarchy, shown in FIG. 13, as background knowledge. That is, if the input keyword is A, its importance degree is 0.8, and the value of retrieval parameter K is 0.35, then the following relation keywords are obtained from the conceptual hierarchy in FIG. 13 and definition 3 described above:

(B,C,D,E,F,G,H,I,J)

1-2-7 Retrieval Expression Generation Processing

Figure 15:
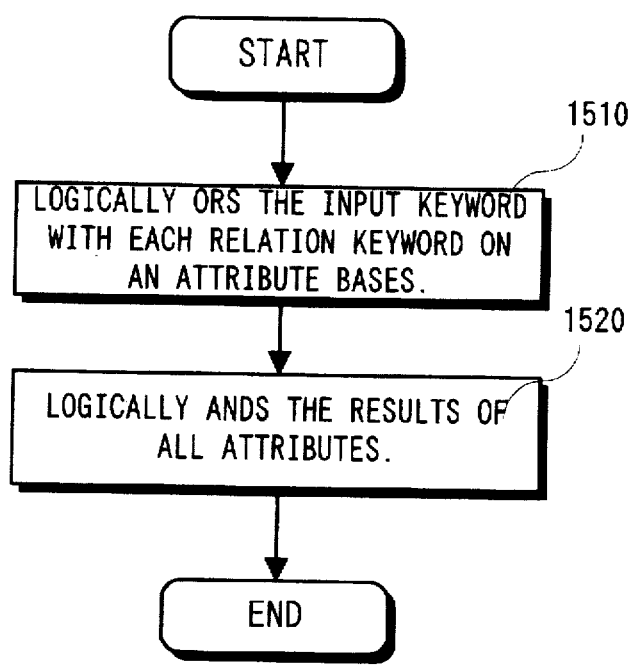
FIG. 15 is a flowchart showing retrieval expression generation processing performed by the retrieval expression generation section 122 shown in FIG. 1.

FIG. 15 is a flowchart showing retrieval expression generation performed by the retrieval expression generation section 122. During retrieval expression generation processing, a retrieval expression is generated (step 540 in FIG. 5) using a user-entered keywords as well as generation keywords generated by the relation keyword generation section 130 using the user-entered keywords. That is, a plurality of equal-sign (=) simple conditional expression, each consisting an attributes and the input keyword or a relation keyword, are logically ORed (step 1510), and then the result of the attributes are logically ANDed (step 1520).

FIG. 16 is a diagram explaining the first example of retrieval expression generation performed by the retrieval expression generation section 122. The top diagram in FIG. 16 shows the input keywords "strawberry" and "figure" obtained via retrieval request input processing, and the relation keywords "pear", "apple", "fixed price", and "price" generated via relation keyword generation processing for each input keyword. It also indicates that the importance degree of each relation keyword is 0.35 or larger. In this case, the retrieval expression generation section 122 logically ORs the input keyword "strawberry" and "figure" with the relation keywords "pear", "apple", "fixed price", and "price" on an attribute basis, and then logically ANDs the OR results to generate a retrieval expression shown in the bottom of FIG. 16.

FIG. 17 is a diagram explaining the second example of retrieval expression generation performance by the retrieval expression generation section 122. The top diagram in FIG. 17 shows the input keywords "strawberry" and "figure" obtained via retrieval request input processing and the relation keyword "fixed price" generated via relation keyword generation processing for each input keyword. It also indicates that the importance degree of the relation keyword is 0.50 or larger. In this case, the retrieval expression generation section 122 logically ORs the input keyword "strawberry" and "figure" with the relation keyword "fixed price" on an attribute basis, and then logically ANDs the OR results to generate a retrieval expression shown in the bottom of FIG. 17.

1-2-8. Retrieval Result Output Processing

FIG. 18 is an example of retrieval result output processing (step 250 n FIG. 2) performed by the retrieval result output section 130. It shown an example of output on the display section 102 that is displayed when a retrieval request is issued. As shown in FIG. 18, the retrieval result output section 130 first displays the retrieval and message "The following data has been retrieved" as well as the retrieval count message "25 items are retrieved". Then, it displays retrieved information, record by record.

1-2-9 Multi-Window Mode

Figure 19:
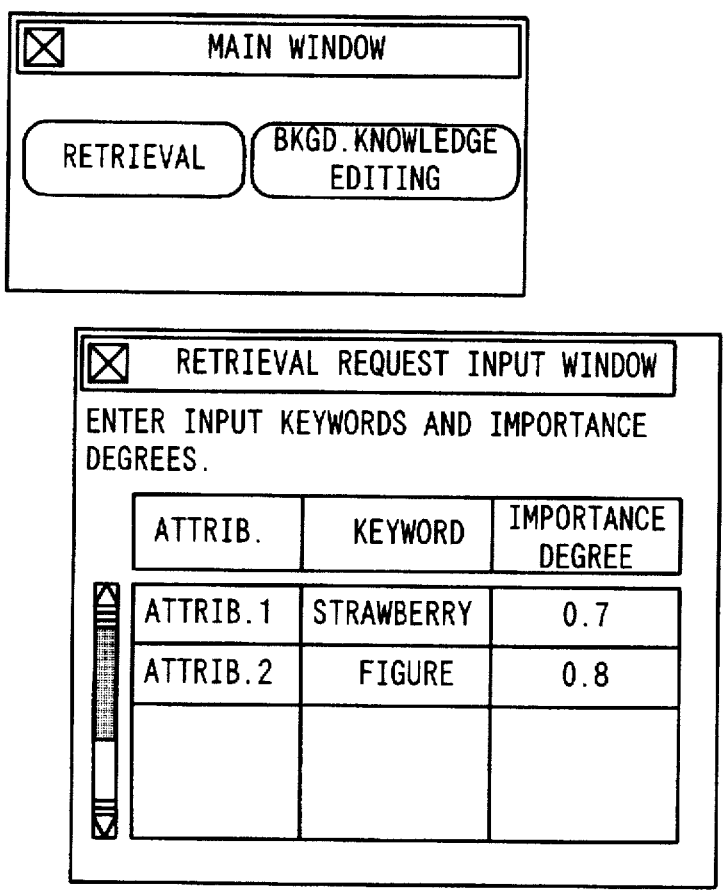
FIG. 19 is a diagram, in the multi-window format, showing an example of a prompt message displayed by the retrieval request input section 110 shown in FIG. 1 and an example of a retrieval request entered in response to the message.
Figure 20:
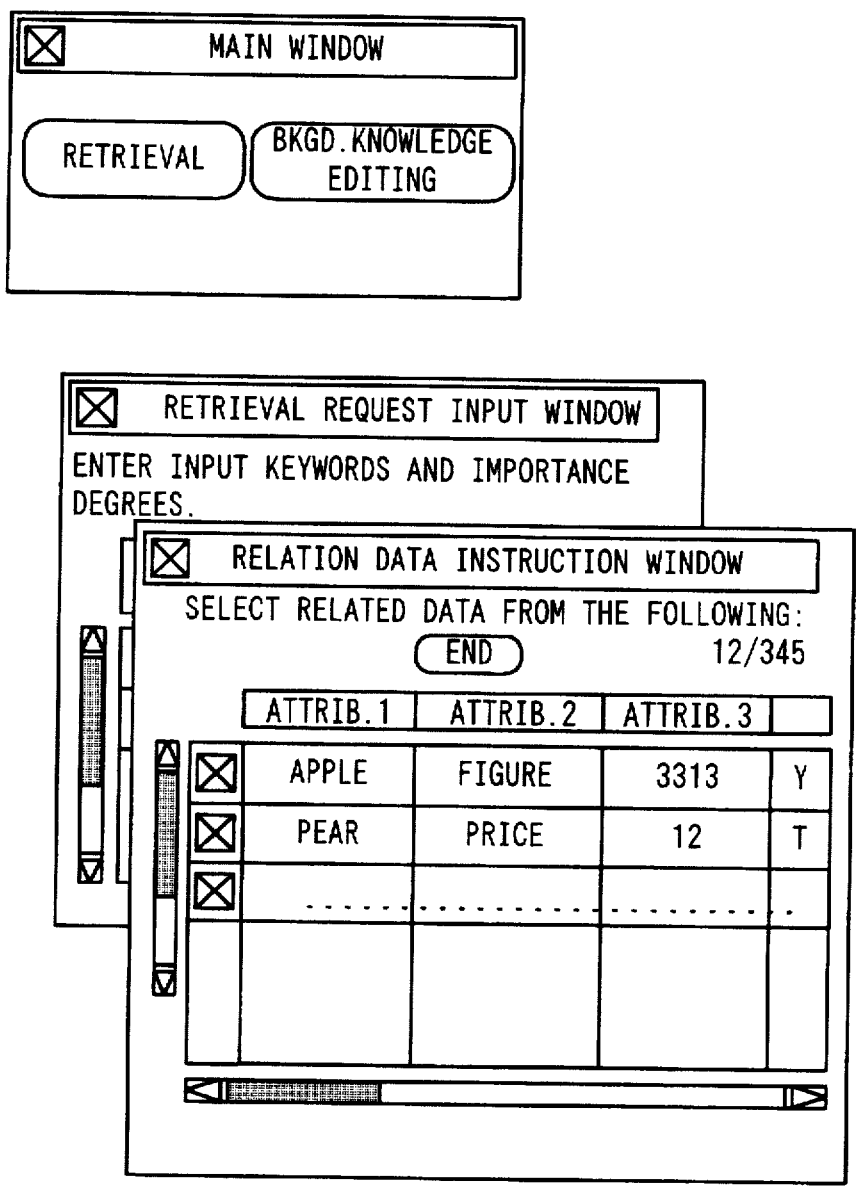
FIG. 20 is a diagram, in the multi-window format, showing an example of retrieved data displayed by the relation data acquisition section 124 shown in FIG. 1 and an example of a relation data instruction entered i response to the displayed data.
Figure 21:
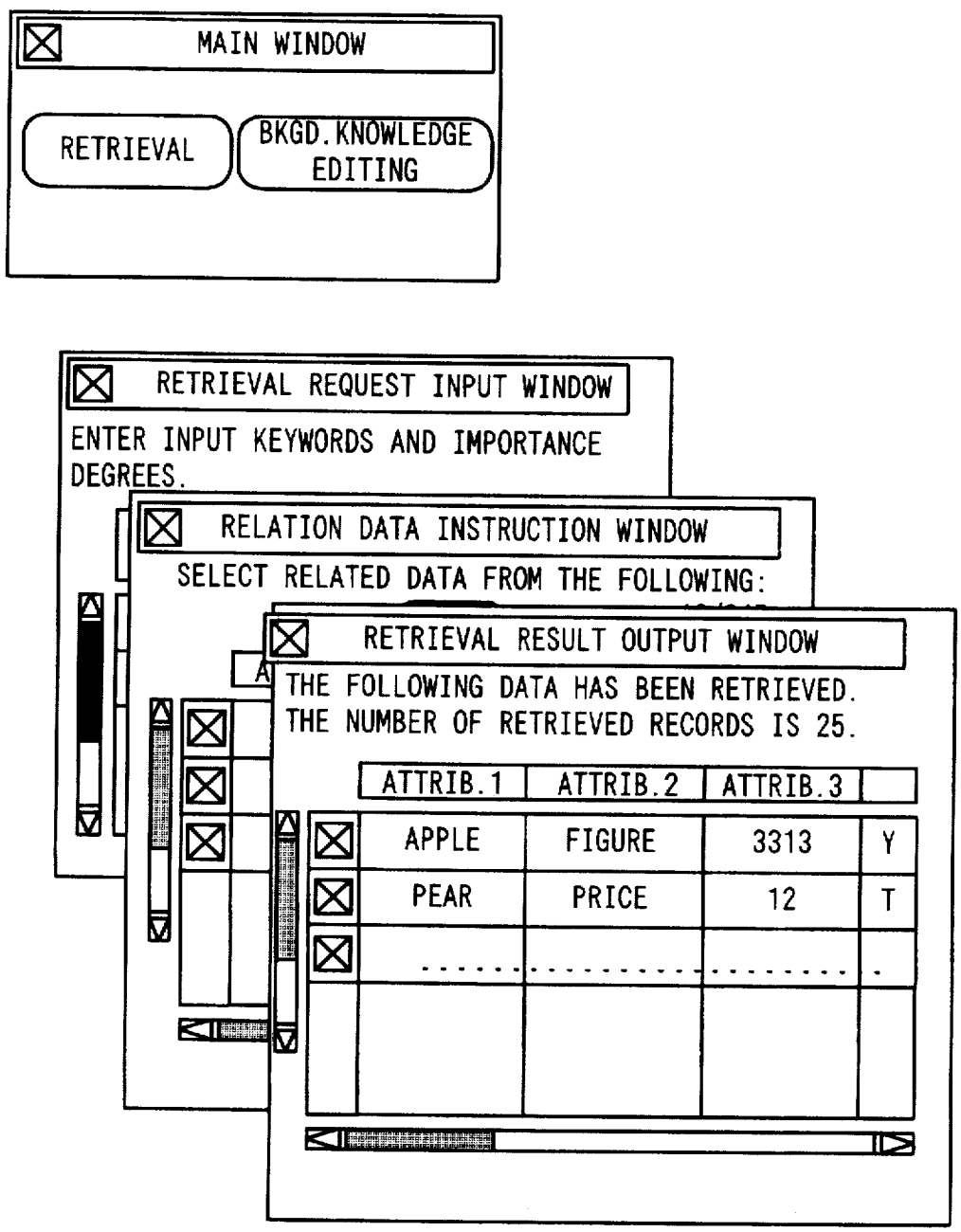
FIG. 21 is a diagram, in the multi-window format, showing an example of retrieval result output from the retrieval result output section 130 shown in FIG. 1.

FIGS. 19–21 each shows an example in which output from each processing is displayed on the display section 102 in the multi-window mode. FIGS. 4, 6 and 18 show an example of retrieval request input processing, retrieval data presentation and relation data acquisition processing, and retrieval result output processing in the single-window mode, while FIGS. 19 to 21 show them in the multi-window mode. That is, FIG. 19 is an input example of a prompt message issued from the retrieval request input section 110 and a retrieval request entered in response to the prompt message. FIG. 20 shows an example of retrieval data displayed by the relation data acquisition section 124 and a relation data instruction entered in response to the display, and FIG. 21 shows an example of retrieval results outputs by the retrieval result output section 21.

2. Embodiment 2

2-1. Structure

Figure 22:
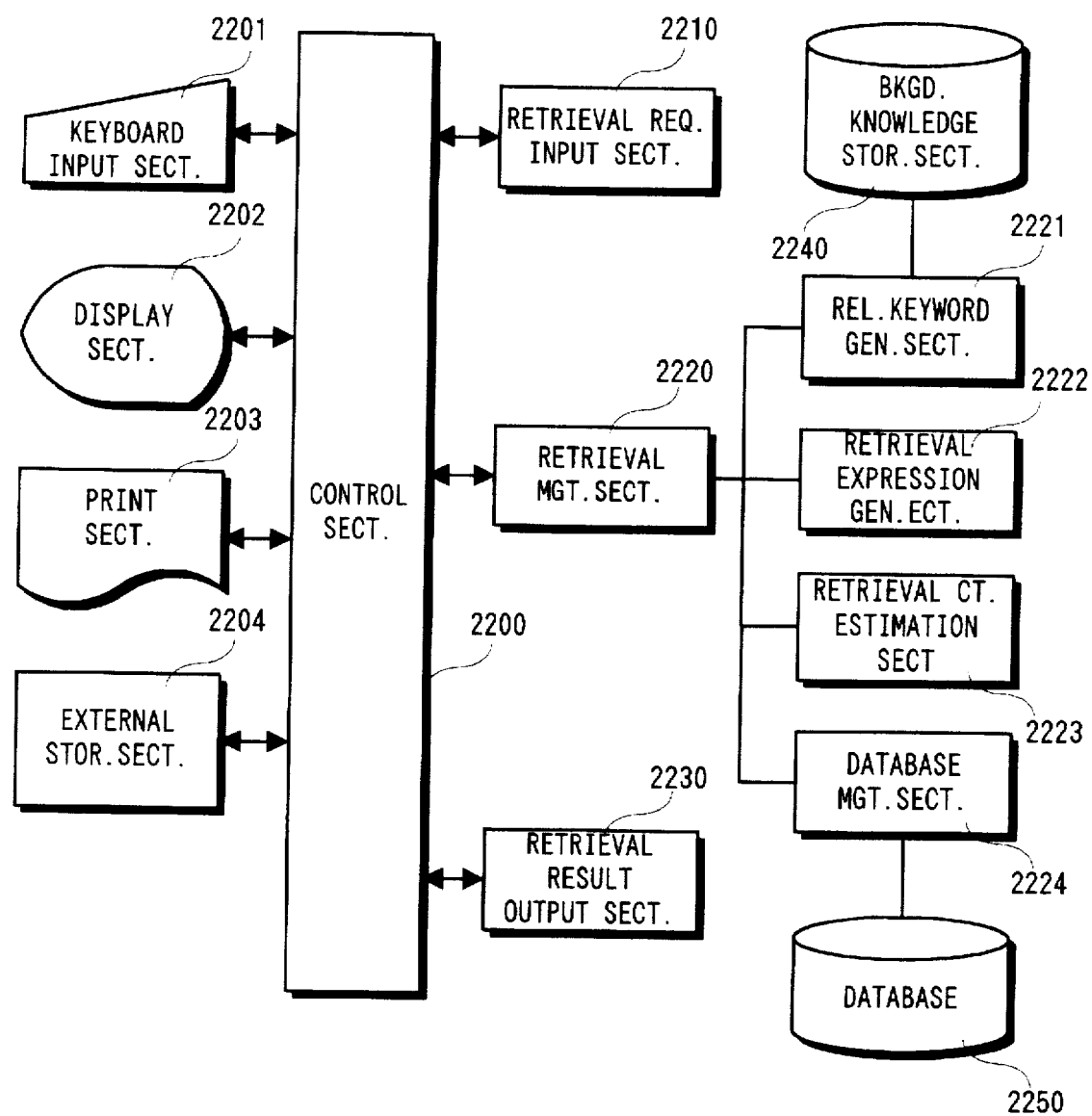
FIG. 22 is a diagram showing an example of the structure of a similar information retrieval system according to this invention.

FIG. 22 is a structure diagram showing an embodiment of the similar information retrieval system according to this invention. The control section 2200, the kernel of the system which controls the whole structure, consists of a general-purpose micro-computer or a special-purpose LSI. Peripheral devices for input/output or storage are connected to this control section 2200: they are the keyboard input section 2201, display section 2202, print section 2203, and external storage section 2204. Although not shown in the diagram, lower-level control sections for controlling input/output and retrieval are provided in the control section 2200. These lower level control sections consist of firmware such as ROM or software programs.

In the system shown in FIG. 22, the retrieval request input section 2210, retrieval management section 2220, and retrieval result output section 2230 are provided to implement the similar information retrieval function introduced by this invention. These are functional section controlled directly by the control section 2200.

In addition, the relation keyword generation section 2221, retrieval expression generation section 2222, retrieval count estimation section 2223, and the database management section 2224 are provided as the lower-level functional sections of the retrieval management section 2220.

The background knowledge storage section 2240 shown in this figure contains background knowledge such as conceptual hierarchies and associative networks. This background knowledge storage section 2240 is composed either of firmware such as ROM or of a hard disk. The device 2250 in the figure is a database containing data to be retrieved. This database 2250 is composed of a hard disk.

Out of these functional sections 2210, 2220, 2230, and 2221–2224, the retrieval request input section 2210, retrieval management section 2220, and retrieval count estimation section 2223 each comprise as follows:

First, the retrieval request input section 2210 reads a retrieval request, consisting of input keywords set up by the user and input keyword importance degrees, and retrieval result conditions (retrieval count condition: maximum and minimum numbers of retrieval counts) under control of the control section 2200 when the user enters them at the keyboard input section 2201.

The retrieval management section 2220 sets up retrieval parameters and, in addition, retrieves data on a trial and error basis via the relation keyword generation section 2221, retrieval expression generation section 2222, and retrieval count estimation section 2223. That is, the retrieval management section 2220 executes a sequence of operations repeatedly on a trial and error basis; it sets up retrieval parameters, causes the relation keyword generation section 2221 to generate relation keywords, causes the retrieval expression generation section 2222 and the retrieval count estimation section 2223 to automatically generate a retrieval expression so that the specified count of data items can be retrieved, and causes the database management section 2224 to execute retrieval. The retrieval count estimation section 2223 estimates the number of retrieval data items corresponding to the retrieval expression. The database management section 2224 uses the retrieval expression generation section 2222 and the retrieval count estimation section 2223 to select a retrieval expression so that the number of data items between the maximum retrieval count and the minimum retrieval count can be obtained. And, the database management section 2224 uses only the retrieval expression thus selected to retrieve data from the database 2250.

Other functional section, that is, the retrieval result output section 2230, relation keyword generation section 2221, and retrieval expression generation section 2222, are structured in the same manner as the corresponding functional sections 130, 121, and 122 used in embodiment 1 described before.

2-2 Operation

Figure 23:
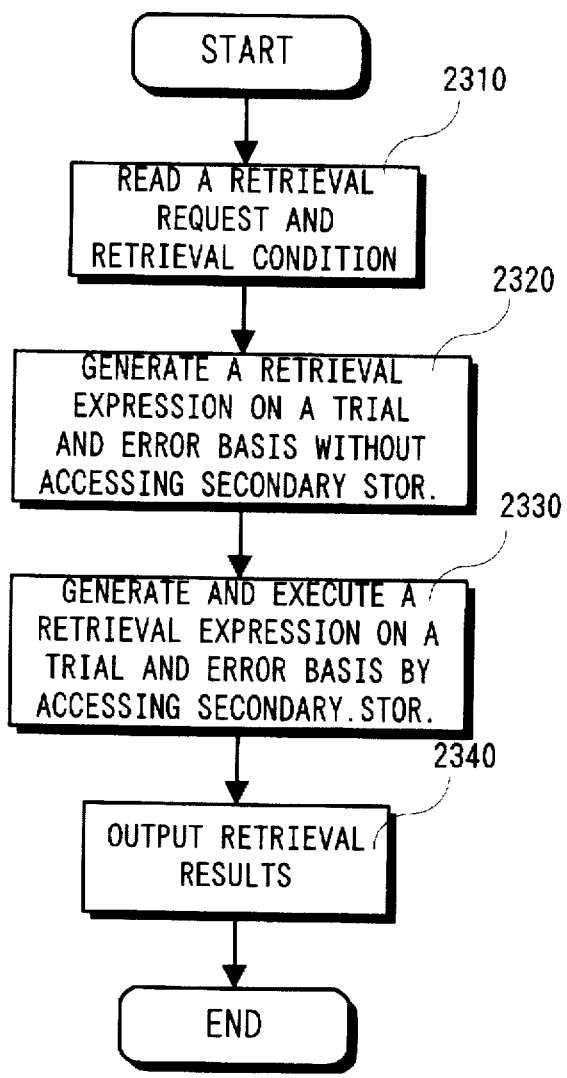
FIG. 23 is a flowchart showing the outline of similar information retrieval processing performed by the system shown in FIG. 22 on a trial and error basis.

FIG. 23 is a flowchart which outlines trial-and-error-basis similar information retrieval processing of the system used in this embodiment. As shown in FIG. 23, trial-and-error-basis similar information retrieval processing starts by reading a retrieval request and a retrieval count condition from the retrieval request input section 210 (step 2310). Then, the retrieval management section 2220 generates a retrieval expression on a trial and error basis without accessing secondary storage (step 2320). That is, before a retrieval expression is actually generated, a retrieval expression is generated on a trial basis to avoid actual retrieval in order to prevent the retrieval time from being increased. Then, with a retrieval expression generated in step 2320 as the initial answer, the retrieval management section 2220 generates and execute a retrieval expression on a trial and error basis by accessing secondary storage (step 2330). Finally, the retrieval result output section 2230 outputs retrieval results when the retrieval count condition is satisfied (step 2340).

2-2-2. Structure of Data and Background Knowledge

The database 2250 and the background knowledge 2240 in this embodiment contain record, for example, record 300 in FIG. 3, and background knowledge, for example, conceptual hierarchy 310 and associative network 320.

2-2-3. Retrieval Request Input Processing.

FIG. 24 is a diagram showing an example of retrieval request input processing performed by the retrieval request input section 2210 (step 2310 in FIG. 23). It shows an example of the contents of a retrieval request displayed on the display section 2202. As shown in FIG. 24, the retrieval request input section 2210 reads a retrieval request consisting of attributes, their values (input keywords), and their importance degrees as well as a retrieval count consisting of the maximum count and the minimum count. In this example, the retrieval request input section 2210 displays the prompt message "Enter input keywords and importance degrees" on the display section 2202. In response to this prompt message, the user enters a retrieval request at the keyboard input section 2201 as follows: the input keyword "strawberry" and its importance degree "0.7" for attribute 1, and the input keyword "figure" and its importance degree "0.08" for attribute 2. The contents of the entered retrieval request are then displayed on the display section 2202.

The retrieval request input section 2210 also displays the prompt message saying "Set up the maximum and minimum retrieval counts (The defaults are 40 and 10)" on the display section 2202. In response to this prompt message, the user enters the maximum retrieval count and the minimum retrieval count as "30" and "10", respectively, and the contents of the response are display on the display section 2202. In this case, if the user does not enter the maximum retrieval count and the minimum retrieval count, the default values "40" and "10" are assumed. When the user confirms the contents displayed on the display section 2202, the retrieval request input section 2210 accepts the contents of entered data as a retrieval request and a retrieval condition.

Figure 25:
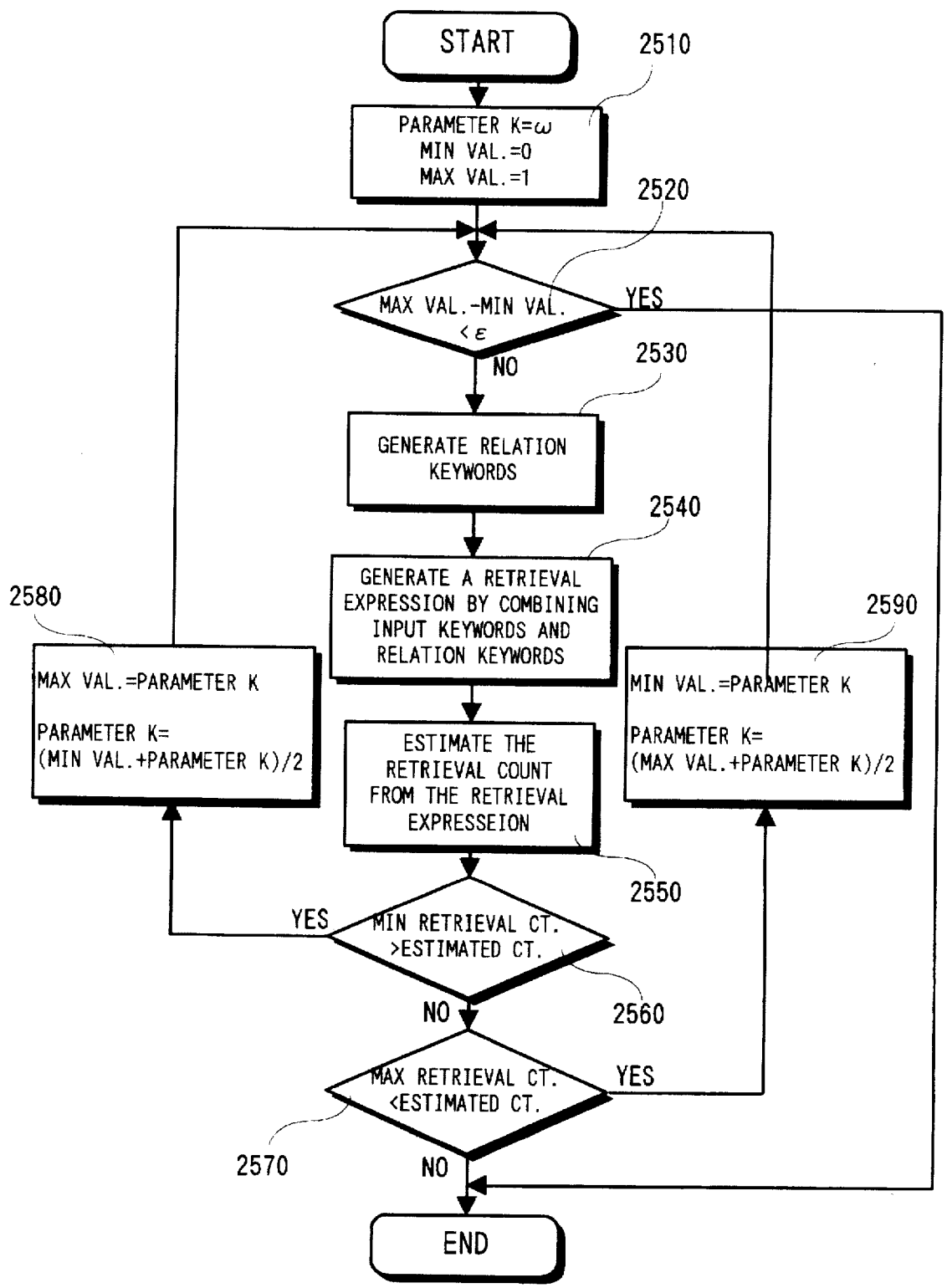
FIG. 25 is a flowchart showing retrieval expression generation processing without accessing secondary storage performed by the retrieval management section 2220 shown in FIG. 22.

2-2-4. Retrieval Expression Generation Processing Without Accessing Secondary Storage FIG. 25 is a detailed flowchart of retrieval expression generation processing in main storage without accessing secondary storage (step 2320 of FIG. 23) performed by the retrieval management section 2220 which is the kernel of the system in this embodiment. Retrieval expression generation processing without accessing secondary storage consists of the following steps: First, the retrieval parameters are initialized (step 2510) and, if the difference between the maximum value and the minimum value of the retrieval parameter does not satisfy the stop condition (step 2520), relation keywords associated with input keywords are generated using background knowledge with the value of the retrieval parameter K as the threshold (step 2530), a retrieval expression is generated from the input keywords and relation keywords (step 2540), the retrieval count of the retrieval expression in estimated without retrieving data from the actual database (step 2550), the retrieval parameter K is modified in a manner similar to the binary search method (step 2580 or step 2590) if the estimated number of retrieval count does not fall between the specific minimum retrieval count and the specified maximum retrieval (step 2560 or step 2570), and the retrieval expression is modified repeatedly until the condition is satisfied.

The retrieval parameter K indicates how restrictive the retrieval condition is. This is, as the value of retrieval parameter K becomes closer to 1, the retrieval condition becomes more restrictive and the number of data items retrieved from the database 2250 decreases. Conversely, as the value of the retrieval parameter K becomes closer to 0, the retrieval condition becomes less restrictive and the number of data items retrieved from the database increases. Thus, the retrieval parameter K is used to exit a condition that is too restrictive or that is too non-restrictive.

Referring to FIG. 25, retrieval expression generation processing in main storage without accessing secondary storage will be described in further detail.

First, the retrieval management section 2220 sets the retrieval parameter K to the initial value of $\omega$ (in this case, $\omega$=0.5), and sets the minimum value and the maximum value of the retrieval parameter to 0 to 1, respectively (step 2510). Then, the retrieval management section 2220 checks whether or not the difference between the maximum value and the minimum value of the retrieval parameter is less than the constant $\epsilon$ (in this case, $\epsilon$=0.01), which was set up at startup, to see if the stop condition is satisfied (step 2520).

If the stop condition is satisfied in step 2520, the retrieval management section ends the trial-and-error-basis retrieval expression generation processing without accessing secondary storage. On the other hand, if the difference between the maximum value and the minimum value of the retrieval parameter is equal to or greater than the constant $\epsilon$, the retrieval management section 2220 passes control to the next step 2530 to continue retrieval expression generation processing without accessing secondary storage. For example, if the maximum value and the minimum value of the retrieval parameter are 1 and 0, respectively, at startup, the difference between them is 1. Because this difference is greater than the constant $\epsilon$=0.01, control is passed to step 2530.

In step 2530, the retrieval management section 2220 causes the relation keyword generation section 2221 to generate relation keywords associated with the user-entered input keywords. In this case, a relation keyword is generated near the corresponding input keyword with the retrieval parameter as the threshold. In addition, the retrieval management section 2220 causes the retrieval expression generation section 2222 to generate a retrieval expression in the Boolean expression format based on the input keywords and relation keywords (step 2540).

Then, the retrieval management section 2220 causes the retrieval count estimation section 2223 to estimate the number of items to be retrieved by the retrieval expression (step 1550). The estimation of the retrieval count is done, for example, in one of the methods a–c;

a) Uses statistical information. This is, in a relational database, the number of relationing tuples, the number of tuples in which an attribute takes different values, the number of pages containing relations are used assuming that attribute values are distributed independently.

b) Uses information about retrieval result cases. That is, the retrieval count is estimated using retrieval result cases whose retrieval expressions or retrieval periods are similar to those of the current retrieval case.

c) Sets retrieval count estimation function.

Out of these methods, method a is employed by commercially, available relational data base management system (RDBMS). In this method, tuple sizes and the number of tuples are sampled at a specified interval.

Next, the retrieval management section 2220 determines, with the use of two conditional branches (step 2560 and step 2570), if the estimated retrieval count is greater than the minimum retrieval count and less than the maximum retrieval count. If the estimated retrieval count is less than the minimum retrieval count in step 2560, the value of the retrieval parameter K is assigned to the maximum value, and the medium between the minimum value of the retrieval parameter and the value of the retrieval parameter K is assigned to the retrieval parameter K (step 2580). For example, if the initial value of the retrieval parameter K is 0.5 and the minimum value and the maximum value of the retrieval parameter are 0 and 1, respectively, the maximum value of the retrieval parameter is changed from 1 to 0.5 and the value of the retrieval parameter K is changed from 0.5 to 0.25.

Conversely, if the estimated retrieval count is greater than the maximum retrieval count in step 2570, the value of the retrieval parameter K is assigned to the minimum value, and the medium between the maximum value of the retrieval parameter and the value of the retrieval parameter K is assigned to the retrieval parameter K (step 2590). For example, if the initial value of the retrieval parameter K is 0.5 and the minimum value and the maximum value of the retrieval parameter are 0 and 1, respectively, the minimum value of the retrieval parameter is changed from 0 to 0.5 and the value of the retrieval parameter K is changed from 0.75.

Therefore, the retrieval management section 2220 ends retrieval expression generation processing without accessing secondary storage if the estimated retrieval count falls in the range between the maximum retrieval count and the minimum retrieval count in step 2570 or if the stop condition described above is satisfied in step 2520.

Figure 26:
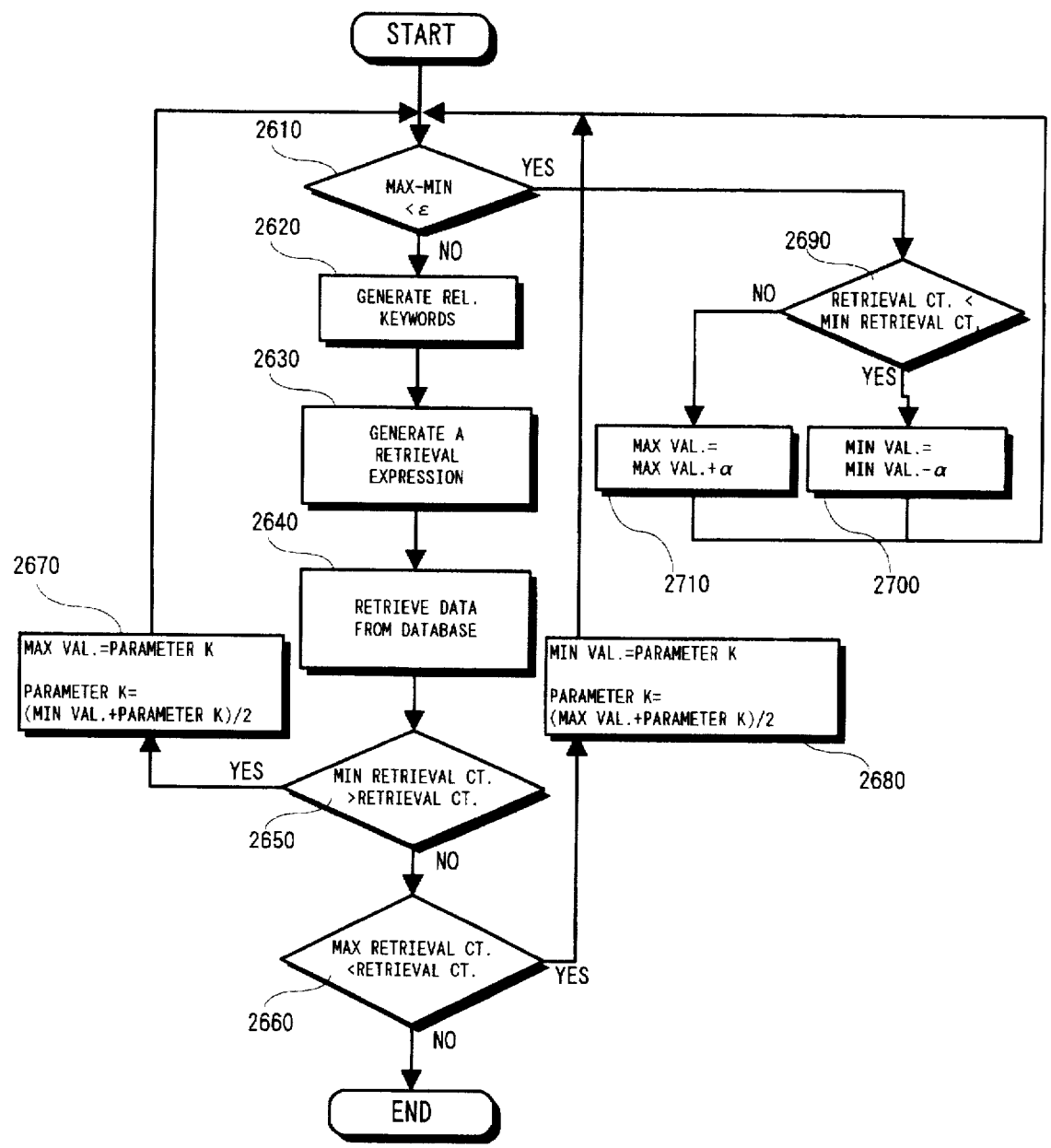
FIG. 26 is a flowchart showing retrieval expression generation and execution processing which accesses secondary storage performed by the retrieval management section 2220 shown in FIG. 22.

2-2-5. Retrieval Expression Generation and Execution Processing by Accessing Secondary Storage FIG. 26 is a detailed flowchart of retrieval expression generation and execution processing in main storage which accesses secondary storage (step 2330 in FIG. 23) performed by the retrieval management section 2220 which is the kernel of the system in this embodiment. Retrieval expression generation processing which accesses secondary storage uses the minimum value and the maximum value of the retrieval parameter that have been set up during retrieval expression generation processing without accessing secondary storage and, if the difference between the maximum value and the minimum value of the retrieval parameter does not satisfy the stop condition (step 2610), relation keywords associated with input keywords are generated using background knowledge with the value of the retrieval parameter K as the threshold (step 2620), a retrieval expression is generated from the input keywords and relation keywords (step 2630), the retrieval count of the retrieval expression is determined by retrieving data from the actual database (step 2640), the retrieval parameter K is modified in a manner similar to the binary search method (step 2670 or step 2680) if the number of obtained items does not fall in the range between the specified minimum retrieval count and the specified maximum retrieval (step 2650 or step 2660), and the retrieval expression is modified repeatedly until the condition is satisfied.

Retrieval expression generation and execution processing which accesses secondary storage differs from the above-described retrieval expression generation processing without accessing secondary storage in that 1) the retrieval parameter K, minimum value, and maximum value, which have been set up during retrieval expression generation processing without accessing secondary storage, are not initialized but are used unmodified, 2) the actual database is accessed, and 3) a check is made to see, without ending processing, if the retrieval count is less than the minimum retrieval count (step 2690) even if the retrieval parameter K satisfies the stop condition, if the retrieval count is less than the minimum retrieval count, the minimum value of the retrieval parameter is decreased by α (step 2700) and, if the retrieval count is greater than the minimum retrieval count, the maximum value of the retrieval parameter is increased by α (step 2710).

Referring to FIG. 26, retrieval expression generation and execution processing in main storage which accesses secondary storage (which is performed by the retrieval management section 2220) will be described in further detail. First, the retrieval management section 2220 checks if the stop condition is satisfied; that is, it checks if the difference between the maximum value of the retrieval parameter and the minimum value of the retrieval parameter is less that the constant ε (in this case, ε=0.01) which has been set up at starting (step 2610).

If the step condition is satisfied in step 2610, the retrieval management section 2220 checks if the actual retrieval count (retrieved from the actual database) is less than the minimum retrieval count (step 2690). If the retrieval count is less than the minimum retrieval count in step 2690, the minimum value of the retrieval parameter is decreased by α (step 2700) and, if the retrieval count is equal to or greater than the minimum retrieval count, the maximum value of the retrieval parameter is increased by α (step 2710), wherein the constant α is a value set up at startup so that it satisfies the relation α>ε. After the minimum value or the maximum value of the retrieval parameter is modified in step 2700 or 2710, control goes back to step 2610.

By executing a sequence of steps 2690, 2700, and 2710 as described above, the result of retrieval from the actual database can be reflected in the retrieval parameter. That is, by increasing or decreasing the maximum or minimum value of the retrieval parameter according to the retrieval result, the user can leave a condition that is too restrictive or that is not too-restrictive.

On the other hand, if the stop condition is not satisfied in step 2610, the retrieval management section 2220 causes the relation keyword generation section 2221 to generate relation keywords associated with the user-entered input keywords (step 2620). In this case, a relation keyword is generated near the corresponding input keyword with the retrieval parameter as the threshold. In addition, the retrieval management section 2220 causes the retrieval expression generation section 2222 to generate a retrieval expression in the Boolean expression format based on the input keywords and relation keywords (step 2630).

The retrieval management section 2220 then causes the database management section 2224 to retrieve data from the database based on the generated retrieval expression (step 2640). Next, the retrieval management section 2220 determines, with the use of two conditional branches (step 2650 and step 2660), if the actual retrieval count is greater than the minimum retrieval count and less than the maximum retrieval count. If the actual retrieval count is less than the minimum retrieval count in step 2560, the value of the retrieval parameter K is assigned to the maximum value of the retrieval parameter, and the medium between the minimum value of the retrieval parameter and the value of the retrieval parameter K is assigned to the retrieval parameter K (step 2670). Conversely, if the actual retrieval count is greater than the maximum retrieval count in step 2660, the value of the retrieval parameter K is assigned to the minimum value, and the medium between the maximum value of the retrieval parameter and the value of the retrieval parameter K is assigned to the retrieval parameter K (step 2680).

Thus, the retrieval management section 2220 ends retrieval expression generation and execution processing which accesses secondary storage if it determines that the retrieval count falls in the range between the retrieval maximum count and the retrieval minimum count. If practice, a loop counter for the processing loop of the retrieval management section 2220 is required to limit number of loop repetitions because the retrieval count sometimes does not fall in the range between the maximum retrieval count and the minimum retrieval count.

2-2-6. Retrieval Keyword Generation Processing

Relation keyword generation processing in this embodiment is executed by the relation keyword generation section 2221, as in embodiment 1, using associative networks or conceptual hierarchies such as the associative network 310 and the conceptual hierarchy 310 in FIG. 7.

2-2-7 Retrieval Expression Generation Processing

Retrieval expression generation processing in this embodiment is executed by the retrieval expression generation section 2222, as in embodiment 1, using input keywords entered by the user and relation keywords obtained by the relation keyword generation section 2221.

2-2-8 Retrieval Result Output Processing

FIG. 27 shows an example of retrieval result output from the retrieval result output section 2230 (step 2340 in FIG. 23). It shows the contents of retrieval result output on the display section 2202. As shown in FIG. 27, the retrieval result output section 2230 first displays the retrieval end message "The following data has been retrieved" as well as the retrieval count message "25 items are retrieved". That is, if the maximum retrieval count and the minimum retrieval count have been set up as 30 and 20, respectively, during retrieval request input processing in FIG. 24, the message indicates that the actual retrieval count is 25. Then, the retrieval result output section displays retrieved information, record by record.

3. Other Embodiments

This invention is not limited to the embodiments described above but may be implemented in a variety of forms, all of which are included in the claim of this invention. In addition, each means used in a system according to this invention may be selected as necessary and processing performed by each means may be selected as necessary.

For example, although the conceptual hierarchy 310 and associative network 320 are used as background knowledge in embodiments 1 and 2 described above, background knowledge representations are not limited to them; a matrix (similar matrix) and a function which represents the matching degree or distance between keywords may be used as long as they represent the relation degrees of keywords.

In addition, although retrieval of a keyword from a database containing records, each consisting of an attribute and the attribute values, is described in embodiments 1 and 2, the similar information retrieval system according to this invention may be used in retrieve data from a database containing various types of data. For example, this invention may be applied also to a document base containing documents by changing an AND-implemented retrieval expression, generation by the retrieval expression generation section 122 or 2222, to an OR-implemented retrieval expression or by allowing the retrieval management section 120 or 2220 to change not only retrieval parameters but also input keywords.

On the other hand, in embodiment 1, the relation data acquisition section 124, which is the relation judgment information acquisition section, acquires only relation data to reflect user's retrieval strategy and stores acquired data in the relevance database 150. However, as a variation of this embodiment, it is possible to acquire only non-relation data or both relation data and non-relation data. Acquiring both relation data and non-relation data and storing them into a relation/non-relevance database allows the user to estimate the retrieval performance in terms of a calling rate and precision, making it possible to generate speedily a retrieval expression on which the user's retrieval strategy is well reflected.

In embodiment 1, a combination of the relevance database management section 123 and relevance database 150 and a combination of the database management section 125 and database 160 are treated as independent components, and the record 300 from the database 160 is stored in the relevance database 150. However, the record 300 in the database 160 can be identified simply by using only the first key (primary key) of the record 300 as the indication information of relation data or non-relation data and storing it in the relevance database 150 (for example, by creating a separate file). This means that the user need not have two database management systems: relevance database management section 123 and database management section 125.

In embodiment 2, the retrieval request input section 2210 accepts a user-specified maximum retrieval count and minimum retrieval count when the user enters input keywords and, according to this condition, the retrieval management section 2220 determines the success or failure of retrieval. However, in this invention, the user does not necessarily enter a retrieval result condition as he enters input keywords; it is also possible to interactively enter the success (satisfies retrieval results) or failure (does not satisfy retrieval results) for a temporary result.

4. Effect of the Invention

As described above, the inventions claimed in claims 1–8 and 16–23 generate a retrieval expression using input keywords specified by the user and relation keywords based on background knowledge, execute retrieval based on this retrieval expression, acquire relation judgment information, which should reflect user's retrieval strategy, if a temporary result obtained by the execution of retrieval does not match the user's retrieval strategy, modify retrieval parameters based on this information, generate a new retrieval expression and, based on this new retrieval expression, execute retrieval again. Therefore, this system enables the user to do efficient similarity retrieval on a trial and error basis without a significant increase in the retrieval time by allowing him to reflect his retrieval strategy easily and precisely through interaction and to reflect background knowledge consisting of simply-structured data easily and precisely.

The inventions claimed in claim 9–15 and 24–30 generate a retrieval expression using input keywords specified by the user and relation keywords based on background knowledge, execute retrieval based on the retrieval expression, modify retrieval parameters based on the retrieval result condition if the retrieval result does not satisfy a user-specified retrieval condition, generate a new retrieval expression and, based on this new retrieval expression, execute retrieval again. Therefore, this system enables the user to do efficient similarity retrieval on a trial and error basis without a significant increase in the retrieval time by allowing him to reflect his retrieval strategy easily and precisely with the use of a user-specified retrieval result condition and to reflect background knowledge consisting of simply-structured data easily and precisely.

What is claimed is:

1. An information retrieval system that retrieves from a database, on a trial and error basis, data satisfying a retrieval condition contained in a retrieval request issued by a user, said information retrieval system comprising:

a database management means for retrieving retrieval data from said database;

a retrieval request input means for accepting from a user a retrieval request including at least one input keyword and at least one degree of importance of the at least one input keyword;

a relation keyword generation means for generating at least one relation keyword using background knowledge and a retrieval parameter, the at least one relation keyword relating to the at least one input keyword;

a retrieval expression generation means for generating a retrieval expression using the at least one input keyword and the at least one relation keyword;

a retrieval management means for setting retrieval parameters to be used by said relation keyword generation means and for causing said database management means to retrieve the retrieval data based on the retrieval expression;

a retrieval result output means for outputting final retrieval results retrieved using said database management means;

a relation judgment information acquisition means for presenting a part of temporary retrieval results, retrieved using said database management means, to the user as retrieval data and for acquiring a retrieval processing stop instruction and relation judgment information from the user, wherein the relation judgment information acquisition means obtains relation judgment information from the user when the user is unsatisfied with the retrieval data presented by said relation judgment information acquisition means; and a relation judgment information management means for storing and retrieving the relation judgment information, wherein said retrieval management means further comprises:

means for modifying the retrieval parameters using the relation judgment information, means for causing said relation keyword generation means to modify that at least one relation keyword, means for causing said retrieval expression generation means to generate a new retrieval expression, means for causing said database management means to retrieve new retrieval data based on the new retrieval expression when said retrieval data presentation means obtains relation judgment information from the user when the user is not satisfied with the retrieval data presented by said relation judgment information acquisition means, and means for sending the retrieval data to said retrieval result output means as the final retrieval results when the user is satisfied with the retrieval data presented by said relation judgment information acquisition means as indicated by acquiring the retrieval processing stop instruction from the user.

2. An information retrieval system as claimed in claim 1, wherein said relation judgment information acquisition means comprises a relation data acquisition means for presenting the part of the temporary retrieval results, retrieved using said database management means, to the user as retrieval data; and means for obtaining relation data and instruction information for the relation data when the user judges that the retrieval data is relation data, and wherein said relation judgment information management means further comprises means for storing and retrieving the relation data and the instruction information for the relation data.

3. An information retrieval system as claimed in claim 1, wherein said relation judgment information acquisition means comprises:

a non-relation data acquisition means for presenting the part of the temporary retrieval results, retrieved using said database management means, to the user as retrieval data; and means for obtaining non-relation data and instruction information for the non-relation data when the user judges that the retrieval data is non-relation data, and wherein said relation judgment information management means further comprises means for storing and retrieving the non-relation data and the instruction information for the non-relation data.

4. An information retrieval system as claimed in claim 1, wherein said relation judgment information acquisition means comprises:

a relation data acquisition means for presenting the part of the temporary retrieval results, retrieved using said database management means, to the user as retrieval data; and means for obtaining relation data and instruction information for the relation data when the user judges that retrieval data is relation data, a non-relation data acquisition means for presenting the part of the temporary retrieval results, retrieved using said database management means, to the user as retrieval data;

means for obtaining non-relation data and instruction information for the non-relation data when the user judges that retrieval data is non-relation data; and wherein said relation judgment information management means further comprises means for storing and retrieving the relation data, the non-relation data, and the instruction information for the relation and non-relation data.

5. An information retrieval system as claimed in claim 1, wherein said relation keyword generation means further comprises means for performing a propagation operation using the at least one input keyword as initial propagation data; and means for generating the at least one relation keyword using one of the retrieval parameters as a threshold, wherein the one of the retrieval parameters was set up by said retrieval management means.

6. An information retrieval system as claimed in claim 5, wherein said background knowledge comprises an associative network including a plurality of keywords with links, each having a corresponding relation degree; and wherein said relation keyword generation means further comprises means for finding a relation degree between a first keyword and a second keyword by finding a maximum product of relation degrees of link strings connecting the first keyword and the second keyword wherein the first keyword matches one input keyword of the at least one input keyword entered from said retrieval request input means, and wherein the second keyword indirectly links to the first keyword; and means for generating the at least one relation keyword using the second keyword if a product of a link between the first keyword and the second keyword and one of said at least one degree of importance of said one input keyword is at least as great as a value of one of the retrieval parameters set up by said retrieval management means.

7. An information retrieval system as claimed in claim 5, wherein said background knowledge comprises an associative network including a plurality of keywords with links, each having a corresponding relation degree; and wherein said relation keyword generation means further comprises means for finding a relation degree between a first keyword and a second keyword by finding a sum of products of relation degrees of link strings connecting the first keyword and the second keyword, wherein the first keyword matches one input keyword of the at least one input keyword entered from said retrieval request input means, and wherein the second keyword indirectly links to the first keyword; and means for generating the at least one relation keyword using the second keyword if a product of a link between the first keyword and the second keyword and one of said at least one degree of importance of said one input keyword is at least as great as a value of one of the retrieval parameters set up by said retrieval management means.

8. An information retrieval system as claimed in claim 5, wherein said background knowledge comprises a conceptual hierarchy including a plurality of hierarchical keywords with links, each having a corresponding relation degree; and wherein said relation keyword generation means further comprises means for finding a relation degree between a first keyword and second keyword by finding a product of relation degrees of link strings from the first keyword to a third lowest-level keyword common to and higher than the first and second keywords, wherein the first keyword matches one input keyword of the at least one input keyword and wherein the second keyword indirectly links to the first keyword; and means for generating the at least one relation keyword using the second keyword if a product of a link between the first keyword and the second keyword and one of said at least one degree of importance of said one input keyword is at least as great as a value of one of the retrieval parameters set up by said retrieval management means.

9. An information retrieval system that retrieves from a database, on a trial and error basis, data satisfying a retrieval condition contained in a retrieval request issued by a user, said information retrieval system comprising:

a database management means for retrieving retrieval data from said database;

a retrieval request input means for accepting from a user a retrieval request including at least one input keyword, at least one of importance of the at least one input keyword, and a retrieval result condition;

a relation keyword generation means for generating at least one relation keyword using background knowledge and a retrieval parameter, the at least one relation keyword relating to the at least one input keyword;

a retrieval expression generation means for generating a retrieval expression using the at least one input keyword and the at least one relation keyword;

a retrieval management means for setting retrieval parameters to be used by said relation keyword generation means and for causing said database management means to retrieve the retrieval data based on a retrieval expression obtained by said retrieval expression generation means; and a retrieval result output means for outputting final retrieval results retrieved using said database management means;

wherein said retrieval management means further comprises:

means for modifying the retrieval parameters, means for causing said relation keyword generation means to modify the at least one relation keyword, means for causing said retrieval expression generation means to generate a new retrieval expression, and means for causing said database management means to retreive data based on the new retrieval expression if a temporary result retrieved using said database management means does not satisfy the retrieval result condition obtained from said retrieval request input means, and wherein said retrieval management means further comprises means for outputting a retrieval result as the final retrieval result when the temporary retrieval result satisfies the retrieval result condition.

10. An information retrieval means as claimed in claim 9, further comprising a retrieval count estimation means for estimating a retrieval count corresponding to the retrieval expression generated by said retrieval expression generation means.

11. An information retrieval system as claimed in claim 10, wherein said retrieval management means further comprises:

means for causing said retrieval expression generation means to generate the retrieval expression on a trial and error basis;

means for pre-processing by causing said retrieval count estimation means to estimate the retrieval count of the retrieval expression without causing said database management means to retrive data from said database and, means for causing said retrieval expression generation means to generate the retrieval expression on a trial and error basis by causing said database management means to retrieve data from said database after the retrieval count estimation means has estimated the retrieval count.

12. An information retrieval system as claimed in claim 9, wherein said relation keyword generation means further comprises means for performing a propagation operation using the at least one input keyword as initial propagation data; and means for generating the at least one relation keyword using one of the retrieval parameters as a threshold, wherein the one of the retrieval parameters was set up by said retrieval management means.

13. An information retrieval system as claimed in claim 12, wherein said background knowledge comprises an associative network including a plurality of keywords with links, each having a corresponding relation degree; and wherein said relation keyword generation means further comprises means for finding a relation degree between a first keyword and a second keyword by finding a link maximum product of relation degrees of link strings connecting the first keyword and the second keyword, wherein the first keyword matches one of the at least one input keyword entered from said retrieval request input means, and wherein the second keyword indirectly links to the first keyword; and means for generating the at least one relation keyword using the second keyword if a product of a link between the first keyword and the second keyword and one of said importance at least one of importance of the one of said at least one input keyword is at least as great as a value of one of the retrieval parameters set up by said retrieval management means.

14. An information retrieval system as claimed in claim 12, wherein said background knowledge comprises an associative network including a plurality of keywords with links, each having a corresponding relation degree; and wherein said relation keyword generation means further comprises means for finding a relation degree between a first keyword and a second keyword by finding a sum of products of relation degrees of link strings connecting the first keyword and the second keyword wherein the first keyword wherein the first keyword matches one of the at least one input keyword entered from said retrieval request input means, and wherein the second keyword indirectly links to the first keyword; and means for generating the at least one relation keyword using the second keyword if a product of a link between the first keyword and the second keyword and one of said at least one degree of importance of the one of said at least one input keyword is at least as great as a value of one of the retrieval parameters set up by said retrieval management means.

15. An information retrieval system as claimed in claim 12, wherein said background knowledge comprises a conceptual hierarchy including a plurality of hierarchical keywords with links, each having a corresponding relation degree; and wherein said relation keyword generation means further comprises means for finding a relation degree between a first keyword and a second keyword by finding a product of relation degrees of link strings from the first keyword to a third lowest-level keyword common to and higher than the first and second keywords, wherein the first keyword matches one of the at least one input keyword entered from said retrieval request input means, and wherein the second keyword indirectly links to the first keyword; and means for generating the at least one relation keyword using the second keyword if a product of a link between the first keyword and the second keyword and one of said at least one input keyword is at least as great as a value of one of the retrieval parameters set up by said retrieval management means.

16. An information retrieval method that retrieves from a database, on a trial and error basis, data satisfying a retrieval condition contained in a retrieval request issued by a user, said information retrieval method comprising the steps of:

accepting a retrieval request including at least one input keyword and at least one degree of importance of the at least one input keyword from the user;

generating at least one relation keyword, related to said at least one input keyword, using background knowledge and a retrieval parameter;

generating a retrieval expression using said at least one input keyword and said at least one relation keyword;

retrieving data from said database based on said retrieval expression;

presenting a part of a temporary retrieval result, obtained in said retrieving step, to the user as retrieval data;

acquiring one of a retrieval processing stop instruction and data relation judgment information from the user;

modifying said retrieval parameter using said data relation judgment information and returning to said step of generating at least one relation keyword if the acquiring step acquires said data relation judgment information from the user; and outputting said temporary retrieval result as said retrieval result when said acquiring step acquires said retrieval processing stop instruction.

17. An information retrieval method as claimed in claim 16, wherein said acquiring step comprises the sub-steps of:

presenting the part of said temporary retrieval results, obtained in said retrieving step, to the user as retrieval data;

determining if the user judges that said retrieval data is relation data;

obtaining relation data and corresponding instruction information when the user judges said retrieval data is relation data; and storing said relation data and instruction information in a relevance database when the user judges said retrieval data is relation data.

18. An information retrieval method as claimed in claim 16, wherein said acquiring step comprises the sub-steps of:

presenting the part of said temporary retrieval results, obtained in said retrieving step, to the user as retrieval data;

determining if the user judges that said retrieval data is non-relation data;

obtaining non-relation data and corresponding instruction information when the user judges said retrieval data is non-relation data; and storing said non-relation data and instruction information in a relevance database when the user judges said retrieval data is non-relation data.

19. An information retrieval method as claimed in claim 16, wherein said acquiring step comprises the sub-steps of:

presenting the part of said temporary retrieval results, obtained in said retrieving step, to the user as retrieval data;

determining if the user judges that the retrieval data is relation data;

obtaining the relation data and corresponding instruction information when the user judges that the retrieval data is relation data;

storing the relation data and the corresponding instruction information in a relevance database when the user judges that the retrieval data is relation data;

obtaining the non-relation data and corresponding instruction information when the user judges that the retrieval data is non-relation data;

storing the non-relation data and the corresponding instruction information in a relevance database when the user judges that the retrieval data is non-relation data.

20. An information retrieval method as claimed in claim 16, wherein said step of generating at least one relation keyword comprises the sub-steps of:

performing a propagation operation using said at least one input keyword as initial propagation data, and generating the at least one relation using said retrieval parameter as a threshold.

21. An information retrieval method as claimed in claim 20, wherein said step of generating the at least one relation keyword comprises the sub-steps of:

generating as said background knowledge an associative network including a plurality of keywords with links, each having a corresponding relation degree;

finding a relation degree between a first keyword and a second keyword by finding a maximum product of relation degrees of link strings connecting the first keyword and the second keyword, wherein the first keyword matches one input keyword of the at least one input keyword and wherein the second keyword indirectly links to said first keyword, and generating a relation keyword using the second keyword if a product of a link between the first keyword and the second keyword and said at least one degree of importance of said at least one input keyword is at least as great as said retrieval parameter.

22. An information retrieval method as claimed in claim 20, wherein said step of generating at least one relation keyword comprises the sub-steps of:

generating as said background knowledge an associative network including a plurality of keywords with links, each having a corresponding relation degree;

finding a relation degree between a first keyword and a second keyword by finding a maximum product of relation degrees of link strings connecting the first keyword and the second keyword, wherein the first keyword matches one input keyword of the at least one input keyword and wherein the second keyword indirectly links to said first keyword if a product of a link between the first keyword and the second keyword and said at least one degree of importance of said at least one input keyword is at least as great as said retrieval parameter.

23. An information retrieval method as claimed in claim 20, wherein said step of generating at least one relation keyword comprises the sub-steps of:

generating as said background knowledge a conceptual hierarchy including a plurality of hierarchical keywords with links, each having a corresponding relation degree;

finding a relation degree between a first keyword and a second keyword indirectly linked to said first keyword by finding a product of the relation degrees of the link strings from the first keyword to a third lowest-level keyword common to and higher than the first keyword and the second keyword; and generating the at least one relation keyword using the second keyword if a product of a link between the first keyword and the second keyword and said at least one degree of importance of said first keyword is at least as large as said retrieval parameter.

24. An information retrieval method that retrieves from a database, on a trial and error basis, data satisfying a retrieval result condition contained in a retrieval request issued by a user, said information retrieval method comprising the steps of:

accepting a retrieval request including at least one input keyword and at least one degree of importance of the at least one input keyword from the user;

generating the at least one relation keyword, related to said at least one input keyword, using background knowledge and a retrieval parameter;

generating a retrieval expression using said at least one input keyword and said at least one relation keyword;

retrieving a temporary retrieval result from said database based on said retrieval expression;

modifying said retrieval parameter and returning to said step of generating at least one relation keyword if the temporary retrieval result obtained in said retrieving step does not satisfy said retrieval result condition; and outputting the temporary retrieval result as a final result if the temporary retrieval result obtained in said retrieving step satisfies said retrieval result condition.

25. An information retrieval method as claimed in claim 24, wherein said retrieving step estimates a retrieval count corresponding to a generated retrieval expression.

26. An information retrieval method as claimed in claim 25, wherein said step of generating the retrieval expression comprises the sub-steps of:

generating a retrieval expression on a trial and error basis;

pre-processing by estimating a retrieval count for the retrieval expression generated in the generating sub-step; and, after the sub-steps of generating and pre-processing, generating a retrieval expression on a trial and error basis while performing said retrieving step.

27. An information retrieval method as claimed in claim 24, wherein said generating step comprises the sub-steps of:

performing a propagation operation using said at least one input keyword as initial propagation data, and generating the at least one relation keyword using said retrieval parameter as a threshold.

28. An information retrieval method as claimed in claim 27, wherein said step of generating at least the relation keyword comprises the sub-steps of:

generating as said background knowledge an associative network including a plurality of keywords with links, each having a corresponding relation degree;

finding a relation degree between a first keyword and a second keyword by finding a maximum product of relation degrees of link strings connecting the first keyword and the second keyword, wherein the first keyword matches one of input keyword the at least one input keyword and wherein the second keyword indirectly links to said first keyword, and generating one relation keyword of the at least one relation keyword using the second keyword if a product of a link between the first keyword and the second keyword and said degree of importance of said at least one input keyword is at least as great as said retrieval parameter.

29. An information retrieval method as claimed in claim 27, wherein said step of generating at least one relation keyword comprises the sub-steps of:

generating as said background knowledge an associative network including a plurality of keywords with links, each having a corresponding relation degree;

finding a relation degree between a first keyword and a second keyword by finding a maximum product of relation degrees of link strings connecting the first keyword and the second keyword, wherein the first keyword matches one input keyword of the at least one input keyword and wherein the second keyword indirectly links to said first keyword if a product of a link between the first keyword and the second keyword and said at least one degree of importance of said at least one input keyword is at least as great as said retrieval parameter.

30. An information retrieval method as claimed in claim 27, wherein said step of generating at least one relation keyword comprises the sub-steps of:

generating as said background knowledge a conceptual hierarchy including a plurality of hierarchical keywords with links, each having a corresponding relation degree;

finding a relation degree between a first keyword and a second keyword indirectly linked to said first keyword by finding a product of the relation degrees of the link strings from the first keyword to a third lowest-level keyword common to and higher than the first keyword and the second keyword; and generating one relation keyword of the at least one relation keyword using the second keyword if a product of a link between the first keyword and the second keyword and said at least one degree of importance of said first keyword is at least as large as said retrieval parameter.

31. An information retrieval system that retrieves data satisfying a retrieval condition from a database, said information retrieval system comprising:

a database management means for managing the database;

a retrieval request input means for accepting a retrieval request including at least one input keyword and at least one degree of importance corresponding to the at least one input keyword;

a relation keyword generation means for generating at least one relation keyword based on background knowledge and a retrieval parameter, the at least one relation keyword relating to the at least one input keyword;

a retrieval expression generation means for generating a retrieval expression based on the at least one input keyword and the at least one relation keyword;

a retrieval means for retrieving retrieval data based on the retrieval expression from said database and for presenting a retrieval result to a user;

a retrieval result output means for outputting the retrieval result; and a relation judgment information acquisition means for acquiring relation judgment information based on the retrieval result from the user, wherein said retrieval means further comprises:

means for modifying the retrieval parameter based on the relation judgment information, means for causing said relation keyword generation means to modify the at least one relation keyword, means for causing said retrieval expression generation means to generate a new retrieval expression, means for retrieving new retrieval data based on the new retrieval expression, and means for sending the retrieval result to said retrieval result output means when said relation judgment information acquisition means does not acquire the relation judgment information.

32. An information retrieval system that retrieves data satisfying a retrieval condition from a database, said information retrieval system comprising:

a database management means for managing the database;

a retrieval request input means for accepting a retrieval request condition and a retrieval request including at least one input keyword and at least one degree of importance corresponding to the at least one input keyword;

a relation keyword generation means for generating at least one relation keyword based on background knowledge and a retrieval parameter, the relation keyword relating to the at least one input keyword;

a retrieval expression generation means for generating a retrieval expression based on the at least one input keyword and the at least one relation keyword;

a retrieval means for retrieving retrieval data based on the retrieval expression from said database; and a retrieval result output means for outputting a retrieval result retrieved using said retrieval means, wherein said retrieval means further comprises:

means for modifying the retrieval parameter if the retrieval result does not satisfy the retrieval result condition, means for causing said relation keyword generation means to modify the at least one relation keyword, means for causing said retrieval expression generation means to generate a new retrieval expression, means for retrieving new retrieval data based on the new retrieval expression, and means for sending the retrieval result to said retrieval result output means when the retrieval result satisfies the retrieval result condition.

33. An information retrieval method that retrieves data satisfying a retrieval condition from a database, said information retrieval method comprising the steps of:

accepting a retrieval result including at least one input keyword and at least one degree of importance corresponding to the at least one input keyword;

generating at least one relation keyword based on background knowledge and a retrieval parameter, the at least one relation keyword relating to the at least one input keyword;

generating a retrieval expression based on the at least one input keyword and the at least one relation keyword;

retrieving retrieval data based on the retrieval expression from said database;

presenting a retrieval result obtained in the retrieving step to a user;

acquiring from the user relation judgment information based on the retrieval result;

modifying the retrieval parameter based on the relation judgment information and returning to said step of generating at least one relation keyword if the acquiring step acquires the relation judgment information from the user; and outputting the retrieval result when said acquiring step does not acquire the relation judgment information from the user.

34. An information retrieval method that retrieves data satisfying a retrieval condition from a database, said information retrieval method comprising the steps of:

accepting a retrieval result condition and a retrieval request including at least one input keyword and at least one degree of importance corresponding to the at least one input keyword;

generating at least one relation keyword based on background knowledge and a retrieval parameter, the at least one relation keyword relating to the at least one input keyword;

generating a retrieval expression based on the at least one input keyword and the at least one relation keyword;

retrieving retrieval data based on the retrieval expression from said database;

modifying the retrieval parameter based on the relation judgment information and returning to said step of generating at least one relation keyword if a retrieval result obtained in said retrieving step does not satisfy the retrieval result condition; and outputting the retrieval result when a retrieval result obtained in said retrieving step satisfies the retrieval result condition.

* * * * *